United States Patent
Gainey, Jr. et al.

(10) Patent No.: US 10,360,032 B2
(45) Date of Patent: *Jul. 23, 2019

(54) PERFORMING AN OPERATION ABSENT HOST INTERVENTION

(71) Applicant: INTERNATIONAL BUSINESS MACHINES CORPORATION, Armonk, NY (US)

(72) Inventors: Charles W. Gainey, Jr., Poughkeepsie, NY (US); Dan F. Greiner, San Jose, CA (US); Lisa C. Heller, Rhinebeck, NY (US); Damian L. Osisek, Vestal, NY (US); Gustav E. Sittmann, III, Webster Groves, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,588

(22) Filed: Sep. 10, 2018

(65) Prior Publication Data

US 2019/0026110 A1 Jan. 24, 2019

Related U.S. Application Data

(63) Continuation of application No. 15/463,633, filed on Mar. 20, 2017, now Pat. No. 10,089,111, which is a
(Continued)

(51) Int. Cl.
*G06F 12/00* (2006.01)
*G06F 13/00* (2006.01)
(Continued)

(52) U.S. Cl.
CPC ........ *G06F 9/30043* (2013.01); *G06F 3/0604* (2013.01); *G06F 3/0605* (2013.01);
(Continued)

(58) Field of Classification Search
None
See application file for complete search history.

(56) References Cited

U.S. PATENT DOCUMENTS 4,972,338 A 11/1990 Crawford et al.
4,992,936 A 2/1991 Katada et al.
(Continued)

FOREIGN PATENT DOCUMENTS

GB 2414842 A 7/2005

OTHER PUBLICATIONS

"z/Architecture—Principles of Operation," International Business Machines Corporation, SA22-7832-05, 6th Edition, Apr. 2007, pp. 1-1218.
"z/VM—Running Guest Operating Systems," International Business Machines Corporation, SC24-5997-02, Third Edition, May 2002, pp. 1-172.
(Continued)

*Primary Examiner* — Sean D Rossiter
(74) *Attorney, Agent, or Firm* — Steven Chiu, Esq.; Blanche E. Schiller, Esq.; Heslin Rothenberg Farley & Mesiti P.C.

(57) ABSTRACT

Optimizations are provided for frame management operations, including a clear operation and/or a set storage key operation, requested by pageable guests. The operations are performed, absent host intervention, on frames not resident in host memory. The operations may be specified in an instruction issued by the pageable guests.

12 Claims, 19 Drawing Sheets

Related U.S. Application Data continuation of application No. 15/166,886, filed on May 27, 2016, now Pat. No. 9,606,799, which is a continuation of application No. 14/994,337, filed on Jan. 13, 2016, now Pat. No. 9,354,873, which is a continuation of application No. 14/837,585, filed on Aug. 27, 2015, now Pat. No. 9,251,085, which is a continuation of application No. 14/576,729, filed on Dec. 19, 2014, now Pat. No. 9,122,477, which is a continuation of application No. 14/136,086, filed on Dec. 20, 2013, now Pat. No. 8,935,504, which is a continuation of application No. 13/941,887, filed on Jul. 15, 2013, now Pat. No. 8,707,000, which is a continuation of application No. 13/554,056, filed on Jul. 20, 2012, now Pat. No. 8,495,326, which is a continuation of application No. 13/292,160, filed on Nov. 9, 2011, now Pat. No. 8,239,649, which is a continuation of application No. 12/036,725, filed on Feb. 25, 2008, now Pat. No. 8,086,811.

(51) Int. Cl.
*G06F 9/30* (2018.01)
*G06F 9/455* (2018.01)
*G06F 12/0891* (2016.01)
*G06F 12/02* (2006.01)
*G06F 12/1009* (2016.01)
*G06F 3/06* (2006.01)
*G06F 12/08* (2016.01)
*G06F 12/12* (2016.01)

(52) U.S. Cl.
CPC .......... *G06F 3/0644* (2013.01); *G06F 3/0652* (2013.01); *G06F 3/0664* (2013.01); *G06F 3/0673* (2013.01); *G06F 9/30003* (2013.01); *G06F 9/30098* (2013.01); *G06F 9/30101* (2013.01); *G06F 9/30145* (2013.01); *G06F 9/45537* (2013.01); *G06F 9/45545* (2013.01); *G06F 9/45558* (2013.01); *G06F 12/023* (2013.01); *G06F 12/08* (2013.01); *G06F 12/0891* (2013.01); *G06F 12/1009* (2013.01); *G06F 12/12* (2013.01); *G06F 2009/45583* (2013.01); *G06F 2212/1041* (2013.01); *G06F 2212/151* (2013.01); *G06F 2212/656* (2013.01); *G06F 2212/657* (2013.01); *G06F 2212/70* (2013.01)

(56) References Cited

U.S. PATENT DOCUMENTS

| | | | |
|---|---|---|---|
| 5,058,003 | A | 10/1991 | White |
| 5,287,474 | A | 2/1994 | Uchino |
| 5,551,013 | A | 8/1996 | Beausoleil et al. |
| 5,574,873 | A | 11/1996 | Davidian |
| 5,617,554 | A | 4/1997 | Alpert et al. |
| 5,790,825 | A | 8/1998 | Traut |
| 5,845,331 | A | 12/1998 | Carter et al. |
| 6,009,261 | A | 12/1999 | Scalzi et al. |
| 6,308,255 | B1 | 10/2001 | Gorishek, IV et al. |
| 6,418,522 | B1 | 7/2002 | Gaertner et al. |
| 6,463,582 | B1 | 10/2002 | Lethin et al. |
| 6,574,706 | B2 | 6/2003 | Sutherland et al. |
| 6,829,693 | B2 | 12/2004 | Dyck et al. |
| 7,120,746 | B2 | 10/2006 | Campbell et al. |
| 7,197,601 | B2 | 3/2007 | Slegel et al. |
| 7,234,037 | B2 | 6/2007 | Errikson et al. |
| 8,086,811 | B2 | 12/2011 | Gainey et al. |
| 8,151,083 | B2 | 4/2012 | Greiner |
| 8,335,906 | B2 | 12/2012 | Greiner et al. |
| 8,478,801 | B2 | 7/2013 | Hutchins et al. |
| 8,935,504 | B1 | 1/2015 | Gainey, Jr. et al. |
| 9,151,083 | B2 | 10/2015 | Gordon et al. |
| 9,152,200 | B2 | 10/2015 | Parthasarathy |
| 9,354,873 | B2 | 5/2016 | Gainey, Jr. et al. |
| 2002/0120807 | A1 | 8/2002 | Sutherland |
| 2002/0120808 | A1 | 8/2002 | Dyck |
| 2002/0129085 | A1 | 9/2002 | Kubala et al. |
| 2003/0056082 | A1 | 3/2003 | Maxfield |
| 2004/0023075 | A1 | 2/2004 | Saito et al. |
| 2004/0024953 | A1 | 2/2004 | Babaian et al. |
| 2004/0098719 | A1 | 5/2004 | Smith et al. |
| 2004/0230758 | A1 | 11/2004 | Slegel et al. |
| 2004/0230768 | A1 | 11/2004 | Slegel et al. |
| 2004/0230976 | A1 | 11/2004 | Slegel et al. |
| 2005/0268071 | A1 | 12/2005 | Blandy et al. |
| 2005/0289246 | A1 | 12/2005 | Easton et al. |
| 2006/0036824 | A1 | 2/2006 | Greiner et al. |
| 2006/0215983 | A1 | 9/2006 | Takeuchi |
| 2007/0016904 | A1 | 1/2007 | Adlung et al. |
| 2007/0028072 | A1 | 2/2007 | Hennessy et al. |
| 2007/0124557 | A1 | 5/2007 | Kanai |
| 2009/0182964 | A1 | 7/2009 | Greiner et al. |
| 2009/0182966 | A1 | 7/2009 | Greiner et al. |
| 2009/0182971 | A1 | 7/2009 | Greiner et al. |
| 2009/0182972 | A1 | 7/2009 | Greiner et al. |
| 2009/0182973 | A1 | 7/2009 | Greiner et al. |
| 2009/0182974 | A1 | 7/2009 | Greiner et al. |
| 2009/0182975 | A1 | 7/2009 | Greiner et al. |
| 2009/0187724 | A1 | 7/2009 | Greiner et al. |
| 2009/0187728 | A1 | 7/2009 | Greiner et al. |
| 2009/0187732 | A1 | 7/2009 | Greiner et al. |
| 2009/0193214 | A1 | 7/2009 | Greiner et al. |
| 2009/0216984 | A1 | 8/2009 | Greiner et al. |
| 2009/0216992 | A1 | 8/2009 | Gainey et al. |
| 2010/0325454 | A1 | 12/2010 | Parthasarathy |
| 2011/0320681 | A1 | 12/2011 | Borntraeger et al. |
| 2012/0054412 | A1 | 3/2012 | Gainey et al. |
| 2012/0265920 | A1 | 10/2012 | Baron |
| 2012/0284477 | A1 | 11/2012 | Gainey et al. |
| 2015/0106599 | A1 | 4/2015 | Gainey et al. |
| 2015/0363199 | A1 | 12/2015 | Gainey et al. |
| 2016/0274913 | A1 | 9/2016 | Gainey et al. |
| 2017/0192786 | A1 | 7/2017 | Gainey et al. |
| 2018/0011797 | A1 | 1/2018 | Shi et al. |

OTHER PUBLICATIONS

"z/VM—General Information," International Business Machines Corporation, GC24-5991-04, Fifth Edition, Apr. 2002, pp. 1-119.
"System/370 Extended Architecture/Interpretive Execution," International Business Machines Corporation, SA22-7095-01, Sep. 1985, pp. 1-32.
"IBM System /370 Extended Architecture, Principles of Operation," Publication No. SA22-7085-1, second Edition, Jan. 1987, 584 pages (Reference can be found in U.S. Appl. No. 11/972,718 and U.S. Appl. No. 11/972,713).
"IBM Power ISA, Version 2.03," Sep. 2006, 850 pages (Reference can be found in U.S. Appl. No. 11/972,718 and U.S. Appl. No. 11/972,713).
The SPARC Architecture Manual, Version 9, 1994 SPARC International Inc., San Jose, CA, SAV09R1459912, ISBN: 0-13-825001-4, 399 pages (Reference can be found in U.S. Appl. No. 11/972,718 and U.S. Appl. No. 11/972,713).
Intel 64 and IA-32 Architectures Software Developer's Manual, vol. 3A: System Programming Guide, Part 1, 253668-036US, Sep. 2010, 850 pages (Hardcopy of manual submitted with U.S. Appl. No. 11/972,718).
Marc et al., "Programmed Storage Utilization Measurement Technique," Technical Disclosure Bulletin, Jun. 1973, pp. 65-66.
Breslau, et al., "Storage Key Protection at Object Level," IBM Technical Disclosure Bulletin, vol. 38, No. 12, Dec. 1995, p. 339.
Larner, et al., "Channel DAT and Page Pinning for Block Unit Transfers," IBM Technical Disclosure Bulletin, vol. 23, No. 2, Jul. 1980, pp. 704-705.

FORMAT OF A PAGE TABLE ENTRY

FORMAT OF PFMF INSTRUCTION

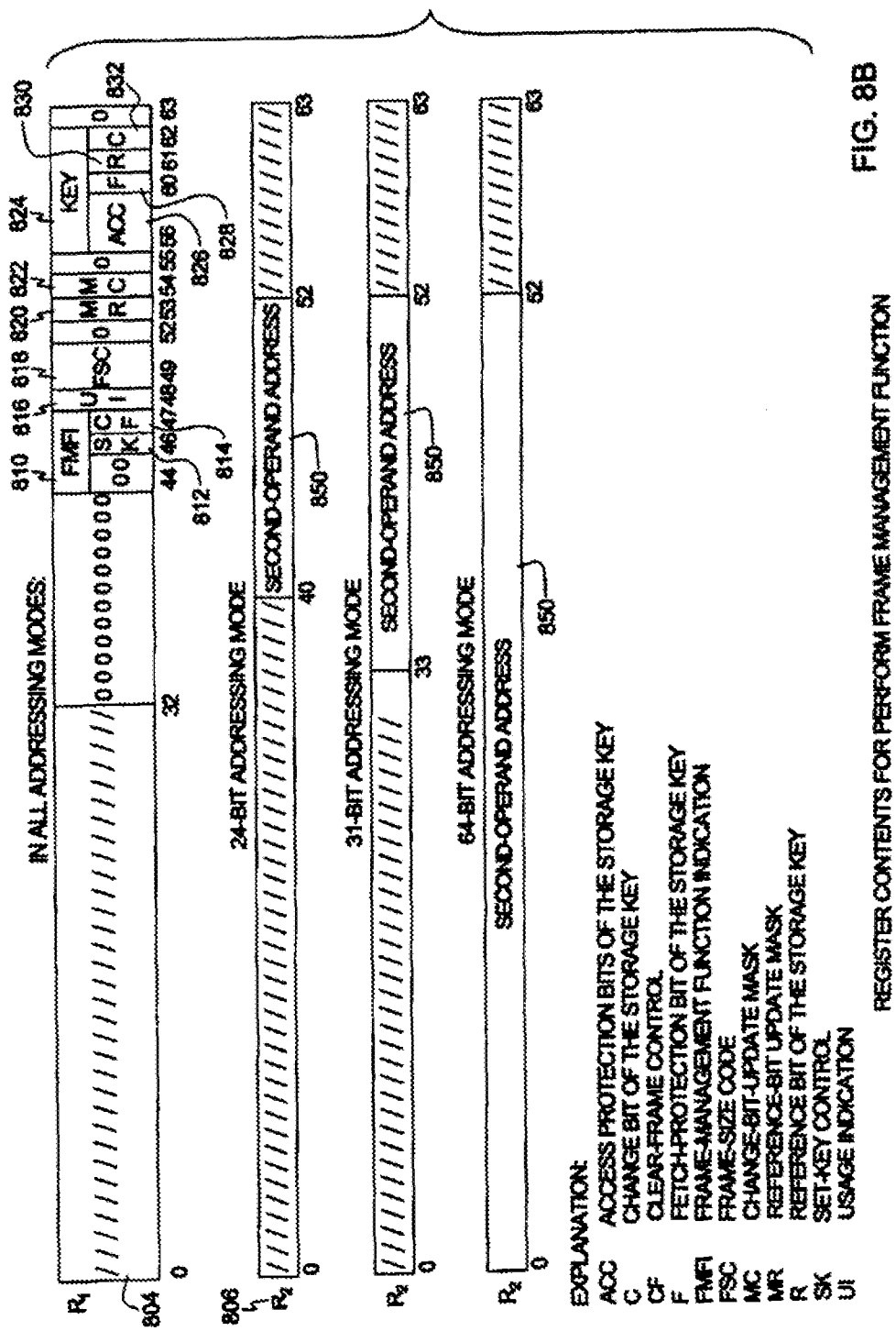

PERFORMING AN OPERATION ABSENT HOST INTERVENTION

This application is a continuation of U.S. application Ser. No. 15/463,633 entitled "PERFORMING AN OPERATION ABSENT HOST INTERVENTION," filed Mar. 20, 2017, which is a continuation of U.S. application Ser. No. 15/166,886 entitled "PERFORMING A CLEAR OPERATION ABSENT HOST INTERVENTION," filed May 27, 2016 (U.S. Pat. No. 9,606,799, issued Mar. 28, 2017), which is a continuation of U.S. application Ser. No. 14/994,337 entitled "PERFORMING A CLEAR OPERATION ABSENT HOST INTERVENTION," filed Jan. 13, 2016 (U.S. Pat. No. 9,354,873, issued May 31, 2016), which is a continuation of U.S. application Ser. No. 14/837,585 entitled "PERFORMING A CLEAR OPERATION ABSENT HOST INTERVENTION," filed Aug. 27, 2015 (U.S. Pat. No. 9,251,085, issued Feb. 2, 2016), which is a continuation of U.S. application Ser. No. 14/576,729, entitled "EXECUTION OF A PERFORM FRAME MANAGEMENT FUNCTION INSTRUCTION," filed Dec. 19, 2014 (U.S. Pat. No. 9,122,477, issued Sep. 1, 2015), which is a continuation of U.S. application Ser. No. 14/136,086, entitled "EXECUTION OF A PERFORM FRAME MANAGEMENT FUNCTION INSTRUCTION," filed Dec. 20, 2013 (U.S. Pat. No. 8,935,504, issued Jan. 13, 2015), which is a continuation of U.S. application Ser. No. 13/941,887, entitled "EXECUTION OF A PERFORM FRAME MANAGEMENT FUNCTION INSTRUCTION," filed Jul. 15, 2013 (U.S. Pat. No. 8,707,000, issued Apr. 22, 2014), which is a continuation of U.S. application Ser. No. 13/554,056, entitled "EXECUTION OF A PERFORM FRAME MANAGEMENT FUNCTION INSTRUCTION," filed Jul. 20, 2012 (U.S. Pat. No. 8,495,326, issued Jul. 23, 2013), which is a continuation of U.S. application Ser. No. 13/292,160, entitled "CLEARING GUEST FRAMES ABSENT PAGING-IN TO HOST MAIN STORAGE," filed Nov. 9, 2011 (U.S. Pat. No. 8,239,649, issued Aug. 7, 2012), which is a continuation of U.S. application Ser. No. 12/036,725, entitled "OPTIMIZATIONS OF A PERFORM FRAME MANAGEMENT FUNCTION ISSUED BY PAGEABLE GUESTS," filed Feb. 25, 2008 (U.S. Pat. No. 8,086,811, issued Dec. 27, 2011), each of which is hereby incorporated herein by reference in its entirety.

BACKGROUND

This invention relates, in general, to computing environments that support pageable guests, and in particular, to facilitating processing of frame management operations within such environments.

Improving processing efficiency of computing environments continues to be an important goal. One area in which improvements have been made, but further enhancements are needed, is in the area of supporting pageable guests.

An operating system frequently performs certain main storage (memory) management actions in support of its applications and to ensure security and data integrity. These actions include clearing frames in real memory and setting associated storage protection keys before the frames are assigned to an application or reassigned from one application to another. When this operating system runs as a pageable guest, that is, in a virtual machine whose memory is paged by a hypervisor or host, these guest memory management operations may incur inefficiencies.

For example, if the host has paged out the contents of a guest frame being reassigned, the clearing operation by the guest operating system would result in a host page fault, causing a context switch to the host. The host would then read the guest frame contents from host auxiliary storage, and switch context back to the guest, which would then clear the frame, immediately overlaying the contents which the host just read in.

Similarly, if the guest operating system clears a frame which an application has released and places it into an available pool to be used later, the resultant host page fault and handling will cause that guest frame to be made host resident, consuming host real memory at a time when no productive use will be made of that memory. The operation of setting the storage key on the guest frame commonly occurs at the same time as clearing in these cases, and its handling entails manipulation of the same host interlock and data structures as the clearing operation. Thus, treating frame management operations like clearing and key setting the same as ordinary instructions leads to additional overhead for context switching between guest and host and for executing the host page fault handler; wasted paging I/O bandwidth; less efficient use of host memory; and repeated serialization and access to host translation and control structures.

SUMMARY

Thus, a need exists for a capability that reduces context switching and facilitates processing in an environment that supports pageable guests. In one example, a need exists for a capability that provides optimizations for frame management functions requested by pageable guests. For instance, a need exists for a capability that provides optimizations for a memory clearing function (e.g., setting frame contents to zeros) issued by pageable guests. In a further example, a need exists for a capability that provides optimizations for a set key function issued by pageable guests. In one particular example, a need exists for a capability that provides optimizations when executing a Perform Frame Management Function instruction issued by a pageable guest, which could entail clearing guest frame contents and/or setting the associated storage key or keys.

The shortcomings of the prior art are overcome and additional advantages are provided through the provision of a computer-implemented method of executing an instruction in a computing environment. The method includes obtaining a perform frame management function (PFMF) instruction; and executing, by a pageable guest, the obtained PFMF instruction. The executing includes performing, absent host intervention, a frame management operation on a guest frame, the guest frame being non-resident in host memory, and the frame management operation being determined based on a control of a plurality of controls associated with the PFMF instruction to be used in frame management.

Computer program products and computer systems relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 8B depicts one example of fields of registers specified in the instruction of FIG. 8A, in accordance with an aspect of the present invention;

DETAILED DESCRIPTION

In accordance with an aspect of the present invention, optimizations are provided for frame management functions issued by pageable guests. For example, a capability is provided that enables a frame clearing function in a pageable guest environment to be optimized. As another example, a capability is provided that enables a set key function issued by pageable guests to be optimized. As one particular example, optimizations are provided for a Perform Frame Management Function (PFMF) issued by pageable guests.

Figure 1:
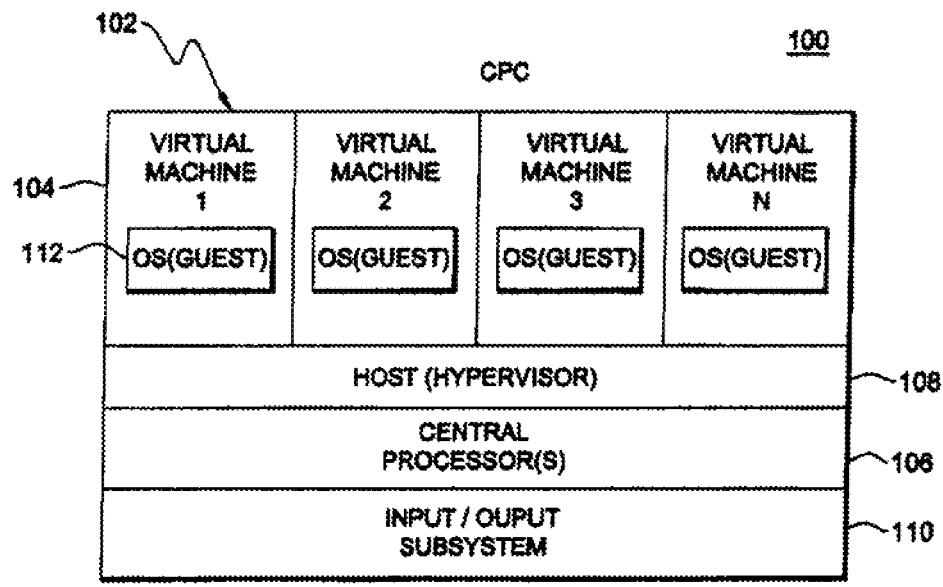
FIG. 1 depicts one embodiment of a computing environment to incorporate and use one or more aspects of the present invention.

One embodiment of a computing environment to incorporate and use one or more aspects of the present invention is described with reference to FIG. 1. Computing environment 100 is based, for instance, on the z/Architecture® offered by International Business Machines Corporation, Armonk, N.Y. The z/Architecture® is described in an IBM® publication entitled, "z/Architecture Principles of Operation," IBM® Publication No. SA22-7832-05, April, 2007, which is hereby incorporated herein by reference in its entirety. In one example, a computing environment based on the z/Architecture® includes an eServerzSeries®, offered by International Business Machines Corporation, Armonk, N.Y. IBM®, z/Architecture® and zSeries® are registered trademarks of International Business Machines Corporation, Armonk, N.Y., USA. Other names used herein may be registered trademarks, trademarks, or product names of International Business Machines Corporation or other companies.

As one example, computing environment 100 includes a central processor complex (CPC) 102 providing virtual machine support. CPC 102 includes, for instance, one or more virtual machines 104, one or more central processors 106, at least one host 108 (e.g., a control program, such as a hypervisor), and an input/output subsystem 110, each of which is described below. In this example, the virtual machines and host are included in memory.

The virtual machine support of the CPC provides the ability to operate large numbers of virtual machines, each capable of hosting a guest operating system 112, such as Linux. Each virtual machine 104 is capable of functioning as a separate system. That is, each virtual machine can be independently reset, host a guest operating system, and operate with different programs. An operating system or application program running in a virtual machine appears to have access to a full and complete system, but in reality, only a portion of it is available.

In this particular example, the model of virtual machines is a V=V model, in which the absolute or real memory of a virtual machine is backed by host virtual memory, instead of real or absolute memory. Each virtual machine has a virtual linear memory space. The physical resources are owned by host 108, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests. One or more aspects of a V=V model are further described in an IBM® publication entitled "z/VM: Running Guest Operating Systems," IBM® Publication No. SC24-5997-02, October 2001, which is hereby incorporated herein by reference in its entirety.

Central processors 106 are physical processor resources that are assignable to a virtual machine. For instance, virtual machine 104 includes one or more logical processors, each of which represents all or a share of a physical processor resource 106 that may be dynamically allocated to the virtual machine. Virtual machines 104 are managed by host 108. As examples, the host may be implemented in microcode running on processors 106 or be part of a host operating system executing on the machine. In one example, host 108 is a VM hypervisor, such as z/VM®, offered by International Business Machines Corporation, Armonk, N.Y. One embodiment of z/VM® is described in an IBM® publication entitled "z/VM: General Information Manual," IBM Publication No. GC24-5991-04, October 2001, which is hereby incorporated herein by reference in its entirety.

Input/output subsystem 110 directs the flow of information between devices and main storage. It is coupled to the central processing complex, in that it can be part of the central processing complex or separate therefrom. The I/O subsystem relieves the central processors of the task of communicating directly with the I/O devices coupled to the CPC and permits data processing to proceed concurrently with I/O processing.

In one embodiment, the host (e.g., z/VM) and processor (e.g., System z) hardware/firmware interact with each other in a controlled cooperative manner in order to process V=V guest operating system operations without requiring transfer of control from/to the guest operating system and the host. Guest operations can be executed directly without host intervention via a facility that allows instructions to be interpretively executed for a pageable storage mode guest. This facility provides an instruction, Start Interpretive Execution (SIE), which the host can issue, designating a control block called a state description which holds guest (virtual machine) state and controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception. One example of interpretive execution is described in System/370 Extended Architecture/Interpretive Execution, IBM Publication No. SA22-7095-01, September 1985, which is hereby incorporated herein by reference in its entirety.

Figure 2:
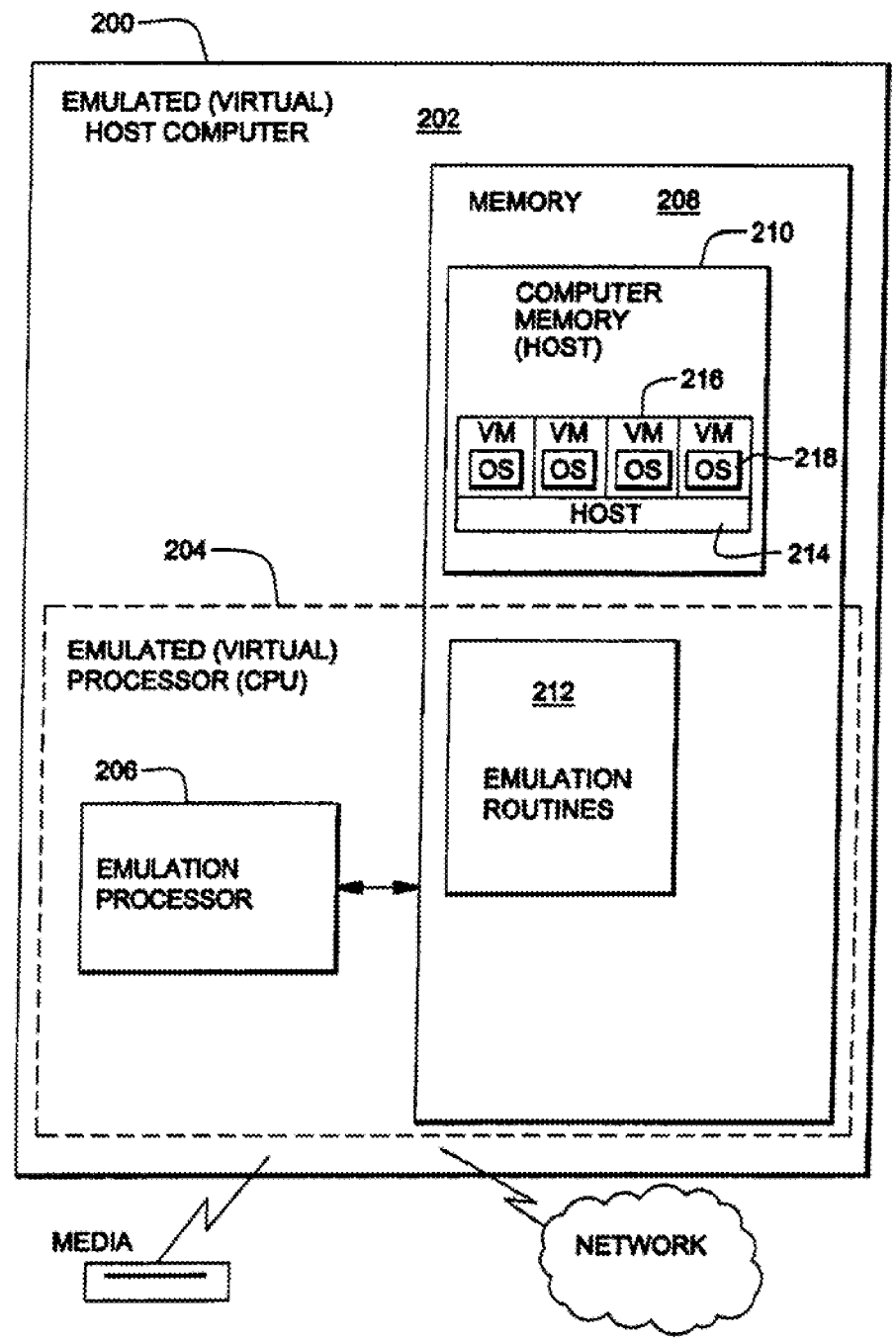
FIG. 2 depicts one embodiment of an emulated computing environment to incorporate and use one or more aspects of the present invention.

Another example of a computing environment to incorporate one or more aspects of the present invention is depicted in FIG. 2. In this example, an emulated host computer system 200 is provided that emulates a host computer 202 of a host architecture. In emulated host computer system 200, a host processor (CPU) 204 is an emulated host processor (or virtual host processor) and is realized through an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 202 according to host computer architecture, and may include both a host or hypervisor 214 and one or more virtual machines 216 running guest operating systems 218, analogous to the like-named elements in FIG. 1.

Emulation processor 206 executes native instructions of an architected instruction set of an architecture other than that of the emulated processor 204. The native instructions are obtained, for example, from emulation routines memory 212. Emulation processor 206 may access a host instruction for execution from a program in host computer memory 210 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the host seeks to execute a guest program in a virtual machine. The emulation routines 212 may include support for this instruction, and for executing a sequence of guest instructions in a virtual machine 216 in accordance with the definition of this SIE instruction.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 206 (such as general registers and dynamic translation of virtual addresses) to improve performance of the emulation routines. Special hardware and offload engines may also be provided to assist processor 206 in emulating the function of host computer 202.

In providing the optimizations described herein, reference is made to various facilities and data structures (e.g., tables, lists). Examples of these facilities and data structures are described below to facilitate an understanding of one or more aspects of the present invention.

One facility that is referenced is dynamic address translation (DAT) and enhanced dynamic address translation (EDat). Dynamic address translation is the process of translating a virtual address during a storage reference into the corresponding real address or absolute address. The virtual address may be a primary virtual address, a secondary virtual address, an Access Register specified virtual address, or a home virtual address. These addresses are translated by means of a primary, a secondary, an AR specified, or a home address space control element, respectively. After selection of the appropriate address space control element, the translation process is the same for all of the four types of virtual address. DAT may use from five to two levels of tables (region first table, region second table, region third table, segment table, and page table) as transformation parameters. Enhanced DAT may use from five to one levels of table, by omitting the page table for some or all translations. The designation (origin and length) of the highest level table for a specific address space is called an address space control element, and it is found for use by DAT in a control register or as specified by an access register. Alternatively, the address space control element for an address space may be a real space designation, which indicates that DAT is to translate the virtual address simply by treating it as a real address and without using any tables.

DAT uses, at different times, the address space control elements in different control registers or specified by the access registers. The choice is determined by the program-specified translation mode specified in the current PSW (Program Status Word). Four translation modes are available: primary space mode, secondary space mode, access register mode, and home space mode. Different address spaces are addressable depending on the translation mode.

The result of enhanced DAT upon a virtual address may be either a real or an absolute address. If it is a real address, a prefixing operation is then performed to obtain the corresponding absolute address, which can be used to reference memory. Prefixing provides the ability to assign the range of real addresses 0-8191 (as an example) to a different area in absolute storage for each CPU, thus permitting more than one CPU sharing main storage to operate concurrently with a minimum of interference, especially in the processing of interruptions. Prefixing causes real addresses in the range 0-8191 to correspond one-for-one to the area of 8K byte absolute addresses (the prefix area) identified by the value in bit positions 0-50 of the prefix register for the CPU, and the area of real addresses identified by that value in the prefix register to correspond one-for-one to absolute addresses 0-8191. The remaining real addresses are the same as the corresponding absolute addresses. This transformation allows each CPU to access all of main storage, including the first 8K bytes and the locations designated by the prefix registers of other CPUs.

Dynamic address translation, prefixing, and enhanced DAT are described in more detail in U.S. Publication No.

2009/0187724A1, entitled, "Dynamic Address Translation with Frame Management," Greiner et al., (IBM Docket No.: POU920070313US1), published Jul. 23, 2009, which is hereby incorporated herein by reference in its entirety.

Another facility referenced is a Host Page Management Assist (HPMA) facility that includes various functions that can be invoked during the interpretation of a pageable storage mode guest. One function that is invoked is a resolve host page function used to dynamically resolve a host page invalid condition. One example of HPMA is described in U.S. Publication No. 2005/0268071A1, entitled "Facilitating Management of Storage of a Pageable Mode Virtual Environment Absent Intervention of a Host of the Environment," Blandy et al., published Dec. 1, 2005, which is hereby incorporated herein by reference in its entirety.

A yet further facility referenced is a Collaborative Memory Management (CMM) facility that provides a vehicle for communicating granular page state information between a pageable guest and its host. It includes a backing reclaim log (CBRL) used to hold a list of frames backing unused pages. One example of CMM is described in U.S. Patent Application Publication No. US 2007/0016904 A1, entitled, "Facilitating Processing Within Computing Environment Supporting Pageable Guests," Adlung et al., published Jan. 18, 2007, which is hereby incorporated herein by reference in its entirety.

Reference is also made to various structures, which are described below.

Frame Descriptor

A frame descriptor describes a host page frame; that is, an area of real memory (frame) capable of holding a portion of virtual memory (page). It is allocated, deallocated, and initialized by the host and may be updated by Host Page Management Assist functions (as described, for instance in U.S. Publication No. 2005/0268071A1, entitled "Facilitating Management of Storage of a Pageable Mode Virtual Environment Absent Intervention of a Host of the Environment," Blandy et al., published Dec. 1, 2005, which is hereby incorporated herein by reference in its entirety).

Figure 3:
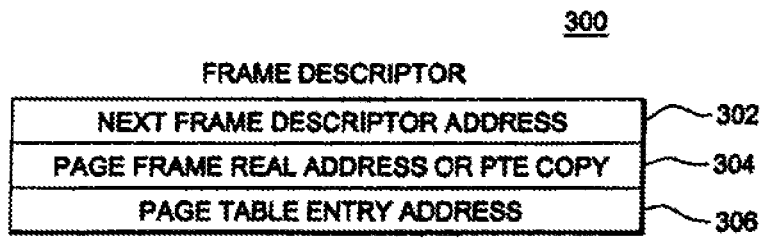
FIG. 3 depicts one example of a frame descriptor used in accordance with an aspect of the present invention.

In one example, a frame descriptor 300 (FIG. 3) is, for instance, a 32-byte block residing in host home space virtual storage on a 32 byte boundary, and includes the following fields, as examples:

(a) Next Frame Descriptor Address 302: In one example, the contents of this field, with five zeros appended on the right, specify the host home space virtual address of the next frame descriptor on the list. A value of zero indicates that the frame descriptor is the last on the list. This field is initialized by the host and may be changed by the host or by Host Page Management Assist functions.

(b) Page Frame Real Address or PTE Copy 304: When the frame descriptor is in the available frame descriptor list (AFDL), the contents of this field, with twelve zeros appended on the right, specify the host real address of the first byte (byte 0) of a host frame that is available for allocation to provide host storage.

When the frame descriptor is in a processed frame descriptor list (PFDL), this field includes a copy of the page table entry (PTE) designated by the page table entry address field, as it appeared before the host page was resolved.

This field is initialized by the host and may be changed by the host or by Host Page Management Assist functions.

(c) Page Table Entry Address 306: When the frame descriptor is on the processed frame descriptor list, the contents of this field, with three zeros appended on the right, specify the host real or host absolute address of the page table entry for the host virtual page.

This field is initialized by the host and may be changed by the host or by Host Page Management Assist functions.

Multiple frame descriptors may be linked to one another to form a list, such as an available frame descriptor list (AFDL) or a processed frame descriptor list (PFDL). A frame descriptor exists in one of the two lists. A separate pair of these lists is provided for each CPU. The origins of the AFDL and PFDL for a CPU are designated by means of fields in the prefix area of the CPU.

The available frame descriptor list (AFDL) is a list of frame descriptors that describes host frames the host has cleared and has made available for allocation to host pages. The AFDL is designated by an AFDL origin (AFDLO) at a specified host real address.

The contents of the AFDLO, with five zeros appended on the right, specify the host home space virtual address of the first frame descriptor on the AFDL. A value of zero indicates that the list is empty.

The AFDLO is initialized by the host and may be changed by the host or Host Page Management Assist functions. The AFDLO is changed, in one embodiment, by means of a non-interlocked update operation.

The processed frame descriptor list (PFDL) is a list of frame descriptors that describes host frames that have been used to resolve host page invalid conditions during guest interpretation. The host frames that are described by the PFDL have been assigned to host pages that provide storage for a guest. The PFDL is designated by a PFDL origin (PFDLO) at a specified host real address. The contents of the PFDLO, with five zeros appended on the right, specify the host home space virtual address of the first frame descriptor on the PFDL. A value of zero indicates that the list is empty.

The PFDLO is initialized by the host and may be changed by the host or a Host Page Management Assist function. The PFDLO is changed, in one embodiment, by means of a doubleword concurrent interlocked update operation that maintains the integrity of the list.

Region Table Entries

Figure 4A:
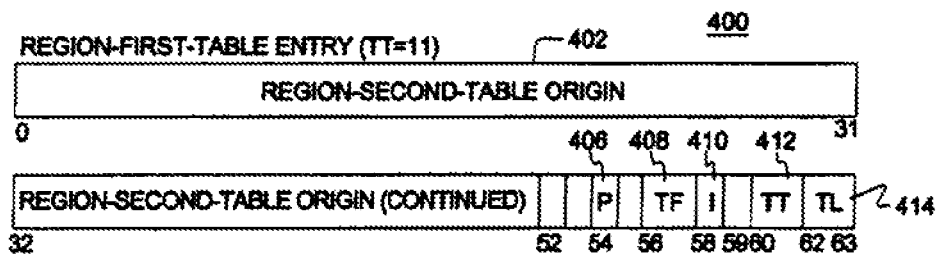
FIGS. 4A-4C depict examples of region table entries used in accordance with an aspect of the present invention.
Figure 4B:
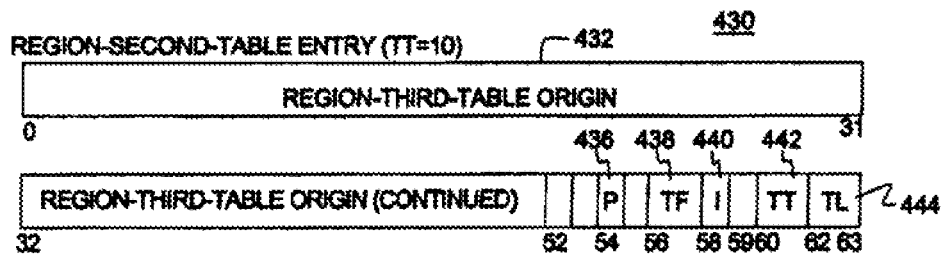
Figure 4C:
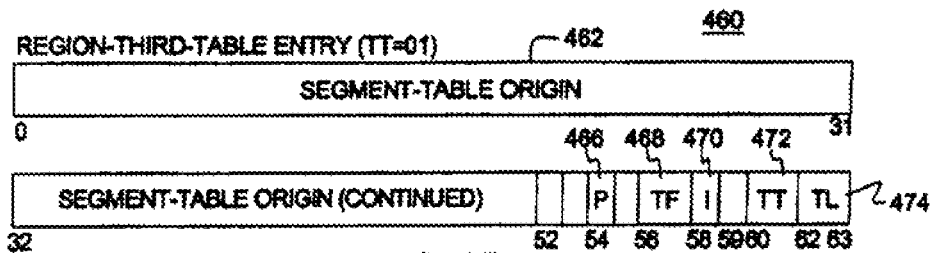

The term "region table entry" indicates a region first table entry, a region second table entry, or a region third table entry. The level (first, second, or third) of the table containing an entry is identified by the table type (TT) bits in the entry. Examples of the formats of entries fetched from the region first table, region second table, and region third table are depicted in FIGS. 4A-4C. In particular, FIG. 4A depicts one embodiment of the format of a Region First Table entry 400; FIG. 4B depicts one embodiment of the format of a Region Second Table entry 430; and FIG. 4C depicts one embodiment of the format of a Region Third Table entry 460.

As examples, the fields in the three levels of region table entries are allocated as follows:

Region Second Table Origin 402, Region Third Table Origin 432, and Segment Table Origin 462: A region first table entry includes a region second table origin. A region second table entry includes a region third table origin. A region third table entry includes a segment table origin. The following description applies to each of the three origins. In one example, bits 0-51 of the entry, with 12 zeros appended on the right, form a 64-bit address that designates the beginning of the next lower level table.

DAT Protection Bit (P) 406, 436, 466: When enhanced DAT applies, bit 54 is treated as being OR'ed with the DAT protection bit in each subsequent region table entry, segment table entry, and, when applicable, page table entry used in the translation. Thus, when the bit is one, DAT protection applies to the entire region or regions specified by the region table entry. When the enhanced DAT facility is not installed, or when the facility is installed but the enhanced DAT enablement control is zero, bit 54 of the region table entry is ignored.

Region Second Table Offset 408, Region Third Table Offset 438, and Segment Table Offset (TF) 468: A region first table entry includes a region second table offset. A region second table entry includes a region third table offset. A region third table entry includes a segment table offset. The following description applies to each of the three offsets. Bits 56 and 57 of the entry specify the length of a portion of the next lower level table that is missing at the beginning of the table; that is, the bits specify the location of the first entry actually existing in the next lower level table. The bits specify the length of the missing portion in units of 4,096 bytes, thus making the length of the missing portion variable in multiples of 512 entries. The length of the missing portion, in units of 4,096 bytes, is equal to the TF value. The contents of the offset field, in conjunction with the length field, bits 62 and 63, are used to establish whether the portion of the virtual address (RSX, RTX, or SX) to be translated by means of the next lower level table designates an entry that actually exists in the table.

Region Invalid Bit (I) 410, 440, 470: A region is a contiguous range of, for example, 2 gigabytes of virtual addresses. Bit 58 in a region first table entry or region second table entry controls whether the set of regions associated with the entry is available. Bit 58 in a region third table entry controls whether the single region associated with the entry is available. When bit 58 is zero, address translation proceeds by using the region table entry. When the bit is one, the entry cannot be used for translation.

Table Type Bits (TT) 412, 442, 472: Bits 60 and 61 of the region first table entry, region second table entry, and region third table entry identify the level of the table containing the entry, as follows: Bits 60 and 61 identify the correct table level, considering the type of table designation that is the address space control element being used in the translation and the number of table levels that have so far been used; otherwise, a translation specification exception is recognized. As an example, the following table shows the table type bits:

| Table Type bits for region table Entries | |
|---|---|
| Bits 60 and 61 | Region-Table Level |
| 11 | First |
| 10 | Second |
| 01 | Third |

Region Second Table Length 414, Region Third Table Length 444, and Segment Table Length 474 (TL): A region first table entry includes a region second table length. A region second table entry includes a region third table length. A region third table entry includes a segment table length. The following description applies to each of the three lengths. Bits 62 and 63 of the entry specify the length of the next lower level table in units of 4,096 bytes, thus making the length of the table variable in multiples of 512 entries. The length of the next lower level table, in units of 4,096 bytes, is one more than the TL value. The contents of the length field, in conjunction with the offset field, bits 56 and 57, are used to establish whether the portion of the virtual address (RSX, RTX, or SX) to be translated by means of the next lower level table designates an entry that actually exists in the table.

All other bit positions of the region table entry are reserved for possible future extensions and should contain zeros; otherwise, the program may not operate compatibly in the future. When enhanced DAT applies, the reserved bit positions of the region table entry should contain zeros even if the table entry is invalid.

Segment Table Entries

Figure 5A:
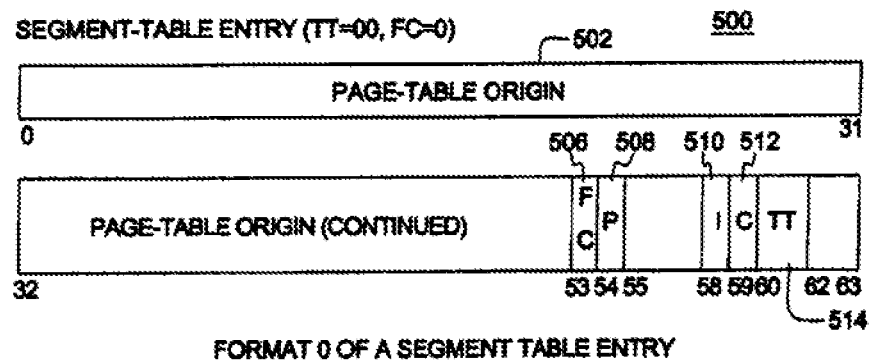
FIGS. 5A-5B depict examples of segment table entries used in accordance with an aspect of the present invention.
Figure 5B:
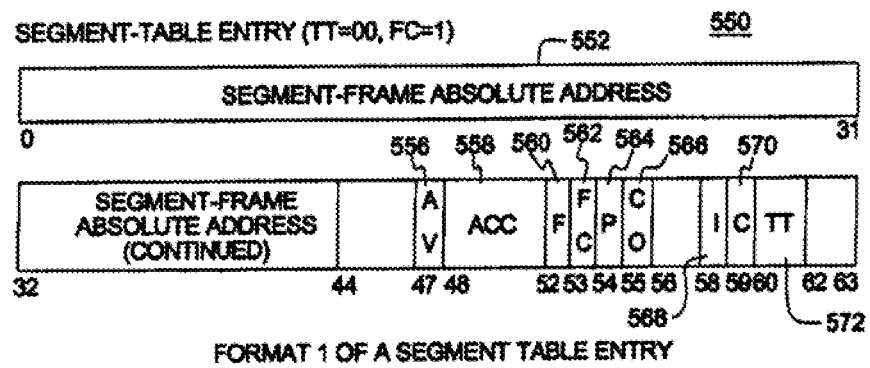

When enhanced DAT does not apply, or when enhanced DAT applies and the STE format control, bit 53 of the segment table entry is zero, the entry fetched from the segment table has the format (e.g., Format 0) as depicted in FIG. 5A. When enhanced DAT applies and the STE format control is one, the entry fetched from the segment table has, for example, the format (e.g., Format 1) as depicted in FIG. 5B.

As one example, a Format 0 segment table entry 500 (FIG. 5A) includes the following fields:

Page Table Origin 502: When enhanced DAT does not apply, or when enhanced DAT applies but the STE format control, bit 53 of the segment table entry, is zero, bits 0-52, with 11 zeros appended on the right, form a 64-bit address that designates the beginning of a page table. It is unpredictable whether the address is real or absolute.

STE Format Control (FC) 506: When enhanced DAT applies, bit 53 is the format control for the segment table entry, as follows:

When the FC bit is zero, bits 0-52 of the entry form the page table origin, and bit 55 is reserved.

When the FC bit is one, bits 0-43 of the entry form the segment frame absolute address, bit 47 is the ACCF validity control, bits 48-51 are the access control bits, bit 52 is the fetch protection bit, and bit 55 is the change recording override. When enhanced DAT does not apply, bit 53 is ignored.

DAT Protection Bit (P) 508: Bit 54, when one, indicates that DAT protection applies to the entire segment.

When enhanced DAT does not apply, bit 54 is treated as being OR'ed with the DAT protection bit in the page table entry used in the translation.

When enhanced DAT applies, the DAT protection bit in any and all region table entries used in the translation are treated as being OR'ed with the DAT protection bit in the segment table entry; when the STE format control is zero, the DAT protection bit in the STE is further treated as being OR'ed with the DAT protection bit in the page table entry.

Segment Invalid Bit (I) 510: Bit 58 controls whether the segment associated with the segment table entry is available.

When the bit is zero, address translation proceeds by using the segment table entry.

When the bit is one, the segment table entry cannot be used for translation.

Common Segment Bit (C) 512: Bit 59 controls the use of the translation lookaside buffer (TLB) copies of the segment table entry. When enhanced DAT does not apply or when enhanced DAT applies but the format control is zero, bit 59 also controls the use of the TLB copies of the page table designated by the segment table entry.

A zero identifies a private segment; in this case, the segment table entry and any page table it designates may be used only in association with the segment table origin that designates the segment table in which the segment table entry resides.

A one identifies a common segment; in this case, the segment table entry and any page table it designates may continue to be used for translating addresses corresponding to the segment index, even though a different segment table is specified.

However, TLB copies of the segment table entry and any page table for a common segment are not usable if the private space control, bit 55, is one in the address space control element used in the translation or if that address space control element is a real space designation. The common segment bit is to be zero if the segment table entry is fetched from storage during a translation when the private space control is one in the address space control element being used; otherwise, a translation specification exception is recognized.

Table Type Bits (TT) 514: Bits 60 and 61 of the segment table entry are 00 binary to identify the level of the table containing the entry. The meanings of possible values of bits 60 and 61 in a region table entry or segment table entry are as follows:

| Table Type Bits 60, 61 | |
|---|---|
| Bits 60 and 61 | Table Level |
| 11 | Region-first |
| 10 | Region-second |
| 01 | Region-third |
| 00 | Segment |

Bits 60 and 61 are to identify the correct table level, considering the type of table designation that is the address space control element being used in the translation and the number of table levels that have so far been used; otherwise, a translation specification exception is recognized.

All other bit positions of the segment table entry are reserved for possible future extensions and should contain zeros; otherwise, the program may not operate compatibly in the future. When enhanced DAT applies, the reserved bit positions of the segment table entry should contain zeros even if the table entry is invalid.

As one example, a Format 1 segment table entry 550 (FIG. 5B) includes the following fields:

Segment Frame Absolute Address (SFAA) 552: When enhanced DAT applies and the STE format control is one, bits 0-43 of the entry, with 20 zeros appended on the right, form the 64-bit absolute address of the segment.

ACCF Validity Control (AV) 556: When enhanced DAT applies and the STE format control is one, bit 47 is the access control bits and fetch protection bit (ACCF) validity control. When the AV control is zero, bits 48-52 of the segment table entry are ignored. When the AV control is one, bits 48-52 are used as described below.

Access Control Bits (ACC) 558: When enhanced DAT applies, the STE format control is one, and the AV control is one, bits 48-51 of the segment table entry include the access control bits that may be used for any key controlled access checking that applies to the address.

Fetch Protection Bit (F) 560: When enhanced DAT applies, the STE format control is one, and the AV control is one, bit 52 of the segment table entry includes the fetch protection bit that may be used for any key controlled access checking that applies to the address.

STE Format Control (FC) 562: When enhanced DAT applies, bit 53 is the format control for the segment table entry, as follows:

When the FC bit is zero, bits 0-52 of the entry form the page table origin, and bit 55 is reserved.

When the FC bit is one, bits 0-43 of the entry form the segment frame absolute address, bit 47 is the ACCF validity control, bits 48-51 are the access control bits, bit 52 is the fetch protection bit, and bit 55 is the change recording override. When enhanced DAT does not apply, bit 53 is ignored.

DAT Protection Bit (P) 564: Bit 54, when one, indicates that DAT protection applies to the entire segment.

When enhanced DAT does not apply, bit 54 is treated as being OR'ed with the DAT protection bit in the page table entry used in the translation.

When enhanced DAT applies, the DAT protection bit in any and all region table entries used in the translation are treated as being OR'ed with the DAT protection bit in the segment table entry; when the STE format control is zero, the DAT protection bit in the STE is further treated as being OR'ed with the DAT protection bit in the page table entry.

Change Recording Override (CO) 566: When enhanced DAT applies, and the STE format control is one, bit 55 of the segment table entry is the change recording override for the segment. When enhanced DAT does not apply, or when enhanced DAT applies but the STE format control is zero, bit 55 of the segment table entry is ignored.

Segment Invalid Bit (I) 568: Bit 58 controls whether the segment associated with the segment table entry is available.

When the bit is zero, address translation proceeds by using the segment table entry.

When the bit is one, the segment table entry cannot be used for translation.

Common Segment Bit (C) 570: Bit 59 controls the use of the translation lookaside buffer (TLB) copies of the segment table entry. When enhanced DAT does not apply or when enhanced DAT applies but the format control is zero, bit 59 also controls the use of the TLB copies of the page table designated by the segment table entry.

A zero identifies a private segment; in this case, the segment table entry and any page table it designates may be used only in association with the segment table origin that designates the segment table in which the segment table entry resides.

A one identifies a common segment; in this case, the segment table entry and any page table it designates may continue to be used for translating addresses corresponding to the segment index, even though a different segment table is specified.

However, TLB copies of the segment table entry and any page table for a common segment are not usable if the private space control, bit 55, is one in the address space control element used in the translation or if that address space control element is a real space designation. The common segment bit is to be zero if the segment table entry is fetched from storage during a translation when the private space control is one in the address space control element being used; otherwise, a translation specification exception is recognized.

Table Type Bits (TT) 572: Bits 60 and 61 of the segment table entry are 00 binary to identify the level of the table containing the entry. The meanings of possible values of bits 60 and 61 in a region table entry or segment table entry are as follows:

| Table Type Bits 60, 61 | |
|---|---|
| Bits 60 and 61 | Table Level |
| 11 | Region-first |
| 10 | Region-second |
| 01 | Region-third |
| 00 | Segment |

Bits 60 and 61 are to identify the correct table level, considering the type of table designation that is the address space control element being used in the translation and the number of table levels that have so far been used; otherwise, a translation specification exception is recognized.

All other bit positions of the segment table entry are reserved for possible future extensions and should contain zeros; otherwise, the program may not operate compatibly in the future. When enhanced DAT applies, the reserved bit positions of the segment table entry should contain zeros even if the table entry is invalid.

Page Table Entries

The state information for guest blocks (e.g., an area (e.g., 4 K-Bytes) in absolute memory that has associated therewith a single storage key and CMM state) is maintained, for instance, in host page tables (PTs) and page status tables (PGSTs) that describe a guest's memory. These tables include, for instance, one or more page table entries (PTEs) and one or more page status table entries (PGSTEs), respectively, which are described in further detail below.

Figure 6:
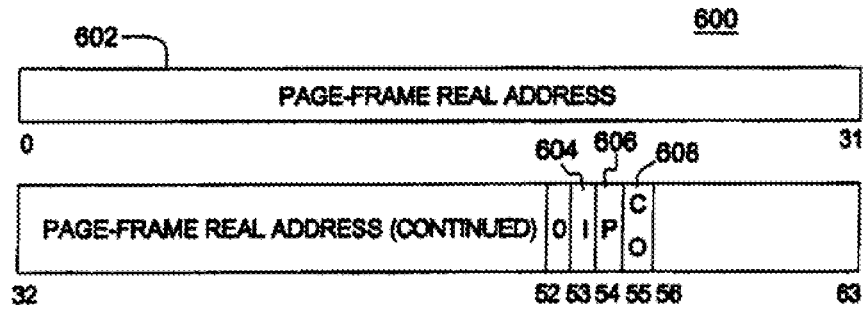
FIG. 6 depicts one example of a page table entry used in accordance with an aspect of the present invention.

One example of a page table entry 600 is described with reference to FIG. 6. In one embodiment, the fields in the page table entry are allocated as follows:

Page Frame Real Address (PFRA) 602: Bits 0-51 provide the leftmost bits of a real (in this case host real) storage address. When these bits are concatenated with the 12-bit byte index field of the virtual address on the right, a 64-bit real address is obtained.

Page Invalid Bit (I) 604: Bit 53 controls whether the page associated with the page table entry is available. When the bit is zero, address translation proceeds by using the page table entry. Further, with regard to collaborative memory management (CMM) between host and guest, the host state is r (resident; i.e., the guest block is present in a host frame). When the bit is one, the page table entry is not used for translation, and the CMM host state is p (preserved; i.e., the guest block is not present in a host frame, but has been preserved by the host in some auxiliary storage) or z (logically zero; i.e., the guest block is not present in a host frame and the contents of the guest block are known to be zeros), as determined by PGSTE.Z.

DAT Protection Bit (P) 606: Bit 54 controls whether store accesses can be made in the page. This protection mechanism is in addition to the key controlled protection and low address protection mechanisms. The bit has no effect on fetch accesses. If the bit is zero, stores are permitted to the page, subject to the following additional constraints:

The DAT protection bit being zero in the segment table entry used in the translation.

When enhanced DAT applies, the DAT protection bit being zero in all region table entries used in the translation.

If the DAT protection bit is one, stores are disallowed. When no higher priority exception conditions exist, an attempt to store when the DAT protection bit is one causes a protection exception to be recognized. The DAT protection bit in the segment table entry is treated as being OR'ed with bit 54 when determining whether DAT protection applies to the page. When enhanced DAT applies, the DAT protection bit in any region table entries used in translation are also treated as being OR'ed with bit 54 when determining whether DAT protection applies.

Other protection mechanisms, such as key-controlled protection, low-address protection, and access-list-controlled protection, may apply independently of DAT protection and may also prohibit accesses.

Change Recording Override (CO) 608: When enhanced DAT does not apply, bit 55 of the page table entry is to contain zero; otherwise, a translation specification exception is recognized as part of the execution of an instruction using that entry for address translation. When enhanced DAT applies and the STE format control is zero, bit 55 of the page table entry is the change recording override for the page.

In addition to the above, in one example, bit position 52 of the entry is to contain zero; otherwise, a translation specification exception is recognized as part of the execution of an instruction using that entry for address translation. Bit positions 56-63 are not assigned and are ignored.

Figure 7:
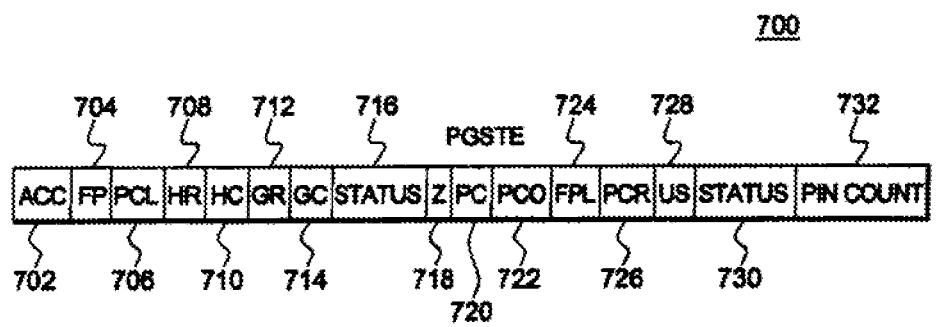
FIG. 7 depicts one example of a page status table entry used in accordance with an aspect of the present invention.

One example of a page status table entry is described with reference to FIG. 7. A page status table entry 700 includes, for instance, the following:

(a) Acc 702: Access control key;
(b) FP 704: Fetch protection indicator;
(c) Page Control Interlock (PCL) 706: This is the interlock control for serializing updates to a page table entry (PTE) and corresponding PGSTE, except for the PGSTE status area and PGSTE bits that are marked as reserved.
(d) HR 708: Host reference backup indicator;
(e) HC 710: Host change backup indicator;
(f) GR 712: Guest reference backup indicator;
(g) GC 714: Guest change backup indicator;
(h) Status 716: Intended for host program use.
(i) Page Content Logically Zero Indicator (Z) 718: This bit is meaningful when the corresponding PTE page invalid (PTE.I) bit is one.

When Z is one, the content of the page that is described by this PGSTE and corresponding PTE is considered to be zero. Any prior content of the page does not have to be preserved and may be replaced by a page of zeros.

When Z is zero, the content of the page described by the PGSTE and corresponding PTE is not considered to be zero. The content of the page is preserved by the host.

When the Z bit is one and the corresponding PTE.I bit is one, the CMM host state is z (logically zero). This means that the page content may be replaced by the host or by a function of the Host Page Management Assist facility.

When the Z bit is one, the corresponding PTE.I bit is one, and the page content is replaced, the page should be replaced by associating it with a frame that has been set to zeros.

When the Z bit is zero and the PTE invalid bit is one, the CMM host state is p (preserved).

(j) Page Class (PC) 720: When zero, the page described by the PGSTE and corresponding PTE is a class 0 page and the delta pinned page count array (DPPCA) for class 0 pages is used for counting pinning and unpinning operations for the page. When one, the page described by the PGSTE and corresponding PTE is a class 1 page and the DPPCA for class 1 pages is used for counting pinning and unpinning operations for the page.

(k) Pin Count Overflow (PCO) 722: When one, the pin count field is in an overflow state. In this case, the total pin count is kept by the host in another data structure not accessed by the machine. When zero, the pin count field is not in an overflow state.

(l) Frame Descriptor On Processed Frame Descriptor List (FPL) 724: When one, a frame descriptor for the page described by the PGSTE and corresponding PTE is in a processed frame descriptor list. The frame descriptor identifies the host frame that was used by a HPMA resolve host page function for the page.

(m) Page Content Replacement Requested (PCR) 726: When one, page content replacement was requested when the HPMA resolve host page function was invoked for the page represented by the PGSTE and corresponding PTE.

(n) Usage State (US) 728: For collaborative memory management between host and guest, this field indicates whether the guest state is S (stable; i.e., the contents of a stable block remain equal to what was set by the guest); U (unused; i.e., the contents of an unused block are not meaningful to the guest); V (volatile; i.e., the contents of a volatile block are meaningful to the guest, but the host may at any time discard the contents of the block and reclaim the backing frame); or P (potentially volatile; i.e., the contents of a potentially volatile block are meaningful to the guest, but based upon guest change history, the host either may discard or should preserve the contents of the block).

(o) Status 730: Intended for host program use.

(p) Pin Count 732: An unsigned binary integer count used to indicate whether the content of the host virtual page represented by the PGSTE and corresponding PTE is pinned in the real host frame specified by the page frame real address field of the PTE. When the value of this field is greater than zero or the page count overflow (PCO) bit is one, the corresponding page is considered to be pinned. When the value of this field is zero and the PCO bit is zero, the corresponding page is not considered to be pinned.

At the time a page is pinned by either the host or the CPU, this field should be incremented by 1. At the time a page is unpinned by either the host or the CPU, this field should be decremented by 1.

When the value of the pin count field is greater than zero or the PCO bit is one, the corresponding PTE.I (page invalid) bit is to be zero. Otherwise, unpredictable results may occur.

While a page is pinned, the host program should not change the contents of the PTE page frame real address (PFRA) field, the setting of the PTE page invalid (I) bit, or the setting of the page protection (P) bit in the PTE or segment table entry (STE). Otherwise unpredictable results may occur.

Further details regarding page table entries and page tables, as well as segment table entries, are provided in an IBM® publication entitled, "z/Architecture Principles of Operation," IBM® Publication No. SA22-7832-05, April 2007, which is hereby incorporated herein by reference in its entirety. Moreover, further details regarding the PGSTE are described in U.S. Publication No. 2005/0268071A1, entitled "Facilitating Management of Storage of a Pageable Mode Virtual Environment Absent Intervention of a Host of the Environment," Blandy et al., published Dec. 1, 2005; and in U.S. Patent Application Publication No. US 2007/0016904 A1, entitled "Facilitating Processing Within Computing Environment Supporting Pageable Guests," Adlung et al., published Jan. 18, 2007, each of which is hereby incorporated herein by reference in its entirety.

In one embodiment, there is one page status table per page table, the page status table is the same size as the page table, a page status table entry is the same size as a page table entry, and the page status table is located at a fixed displacement (in host real memory) from the page table. Thus, there is a one-to-one correspondence between each page table entry and page status table entry. Given the host's virtual address of a page, both the machine and the host can easily locate the page status table entry that corresponds to a page table entry for a guest block.

Perform Frame Management Function (PFMF)

In accordance with an aspect of the present invention, optimizations are provided for one or more aspects of a Perform Frame Management Function. Thus, prior to describing the optimizations, one example of the PFMF instruction and processing associated therewith are described. This is to facilitate an understanding of one or more aspects of the present invention.

Figure 8A:
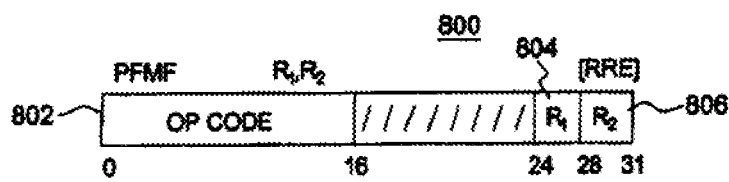
FIG. 8A depicts one example of a format of a Perform Frame Management Function (PFMF) instruction, in accordance with an aspect of the present invention.

As one example, a format of a Perform Frame Management Function is described with reference to FIG. 8A. As depicted, a PFMF instruction 800 includes an opcode 802 identifying the PFMF instruction, a first register field 804 including a first operand, and a second register field 806 indicating a second operand address.

Subject to the controls in the first operand register, a frame management function is performed for the storage frame designated by the second operand address.

One example of the contents of general register R1 804 (R1 designates a general register) are described with reference to FIG. 8B and include, for instance:

Frame Management Function Indications 810: Bit positions 44-47 of general register R1 include the frame management function indications (FMFI), as follows:

Set Key Control (SK) 812: Bit 46 controls whether the storage key for each 4K-byte block in the frame is set from bits 56-62 of general register R1. When the SK control is zero, the keys are not set; when the SK control is one, the keys are set.

Clear Frame Control (CF) 814: Bit 47 controls whether the contents of the frame are set to zeros. When the CF control is zero, no clearing operation is performed. When the CF control is one, the frame is cleared to zeros.

Usage Indication (UI) 816: Bit position 48 of general register R1 includes the usage indication (UI). When bit 48 is zero, it indicates that the program does not anticipate immediate usage of the frame. When bit 48 is one, it indicates that the program anticipates usage of the frame in the near future. The definition of immediate or near future is a program dependent indication of likelihood of the program using the frame in the immediate or near future. That is, it is a program defined time. For instance, if the guest operating system is using PFMF to provide memory requested by an application, for instance through a GETMAIN or malloc( ) request, then immediate usage is likely, so UI would be set to one. If the application has returned the memory which the frame backs, for instance through a FREEMAIN or free( ) request, and the operating system is using PFMF to clear the frame prior to placing it into an available pool, imminent usage is not likely, so UI would be set to zero. Other examples are also possible.

Frame Size Code (FSC) 818: Bits 49-51 of general register R1 include the frame size code (FSC), as follows:

Meaning of frame size codes

| FSC | Meaning |
|---|---|
| 0 | 4K-byte frame |
| 1 | 1M-byte frame |
| 2-7 | Reserved |

Reference Bit Update Mask (MR) 820: When the set key control, bit 46 of general register R1, is one, bit 53 of general register R1 controls whether updates to the reference bit in the storage key may be bypassed.

Change Bit Update Mask (MC) 822: When the set key control, bit 46 of general register R1, is one, bit 54 of general register R1 controls whether updates to the change bit in the storage key may be bypassed.

In one embodiment, the handling of the MR and MC bits is the same as the handling of the corresponding bits of the M3 field of a Set Storage Key Extended instruction, except that general register R1 is not updated with the contents of the previous key, and the condition code is not changed.

Key 824: When the set key control, bit 46 of general register R1, is one, bits 56-62 of the register include the storage key to be set for each 4K-byte block in the frame, with the access protection bits 826, fetch protection bit 828, reference bit 830, and change bit 832 in bit positions 56-59, 60, 61, and 62, respectively.

General register R2 806, examples of which are also depicted in FIG. 8B, includes, for instance, the real or absolute address 850 of the storage frame upon which the frame management function is to be performed. When the frame size code designates a 4K-byte block, the second operand address is real; when the frame size code designates a 1M-byte block the second operand address is absolute. The handling of the address in general register R2 depends on the addressing mode. In the 24-bit addressing mode, the contents of bit positions 40-51 of the register, with 12 rightmost zeros appended, are the address, and bits 0-39 and 52-63 in the register are ignored. In the 31-bit addressing mode, the contents of bit positions 33-51 of the register, with 12 rightmost zeros appended, are the address, and bits 0-32 and 52-63 in the register are ignored. In the 64-bit addressing mode, the contents of bit positions 0-51 of the register, with 12 rightmost zeros appended, are the address, and bits 52-63 in the register are ignored.

In processing a PFMF instruction, the following occurs, in one example:

When the frame size code is 0, the specified frame management functions are performed for the 4K-byte frame specified by the second operand. General register R2 is unmodified in this case.

When the frame size code is 1, the specified frame management functions are performed for one or more 4K-byte blocks within the 1M-byte frame, beginning with the block specified by the second operand address, and continuing to the right with each successive block up to the next 1M-byte boundary. In this case, the Perform Frame Management Function is interruptible, and processing is as follows:

When an interruption occurs (other than one that follows termination), the second operand address in general register R2 is updated by the number of 4K-byte blocks processed, so the instruction, when re-executed, resumes at the point of interruption.

When the instruction completes without interruption, the second operand address in general register R2 is updated to the next 1M-byte boundary.

When the frame size code is 1 in the 24-bit or 31-bit addressing modes, the leftmost bits which are not part of the address in bit positions 32-63 of general register R2 are set to zeros; bits 0-31 of the register are unchanged.

When the clear frame control is one, references to main storage within the second operand are not necessarily single access references and are not necessarily performed in a left-to-right direction as observed by other CPUs and by channel programs. The clear operation is not subject to key controlled protection.

When the storage key control is one, the operation for each 4K-byte block is similar to that described in relation to the SSKE except that when the keys for multiple blocks are set, the condition code and the contents of general register R1 are unchanged.

A serialization and checkpoint synchronization function is performed before the operation begins and again after the operation is completed, except that when the seven bits of the storage keys to be set are the same as bits 56-62 of general register R1, or when the MR and MC bits allow the storage keys to remain unchanged, it is unpredictable whether the serialization and checkpoint synchronization operations are performed after the operation completes. It is unpredictable whether the clear frame or the set key operation is performed first when both of the respective controls are one. Provided that there is no other access to the storage by other CPUs or a channel subsystem, the final results of the instruction reflect the specified key value including the specified R and C values when MR and MC are zero.

Special Conditions

A specification exception is recognized and the operation is suppressed for any of the following conditions:

Bits 32-45, 52, 55, or 63 of general register R1 are not zero.

The frame size code specifies a reserved value.

Condition Code: The code remains unchanged.

Perform Frame Management Function (PFMF)—Clear Frame

Figure 9A:
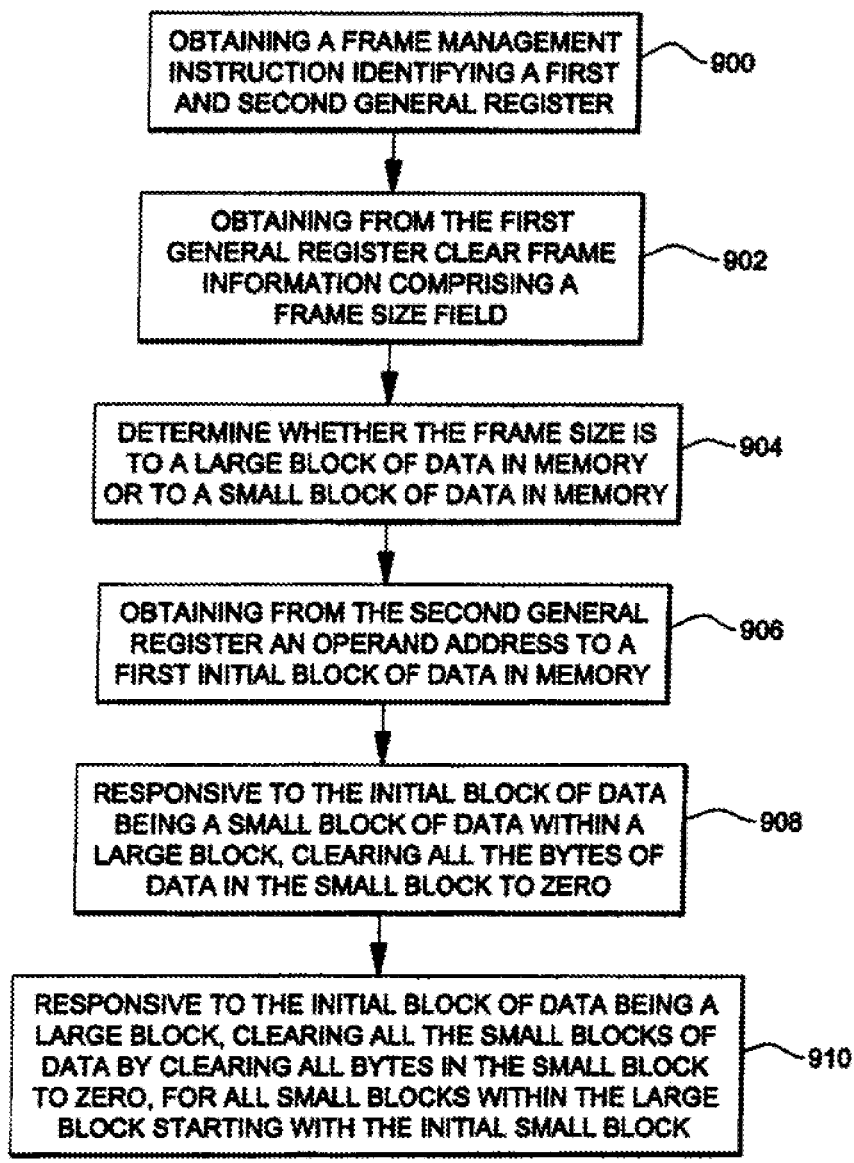
FIGS. 9A-9B depict one embodiment of the logic associated with the Perform Frame Management Function instruction, in accordance with an aspect of the present invention.

One embodiment of the logic of the Perform Frame Management Function in which the indicated frames are cleared is described with reference to FIG. 9A.

Generally, this embodiment involves, at 900, obtaining a machine instruction defined for the machine architecture. The instruction includes an opcode for a frame management instruction. The machine instruction has a first field identifying a first general register and a second field identifying a second general register. At 902, clear frame information having a frame size field is obtained from the first general register. At 904, a determination is made whether the frame size field indicates that a storage frame is one of a small block of data in memory or a large block of data in memory. Then, at 906, a second operand address of the storage frame upon which the machine instruction is to be performed is obtained from the second general register. The second operand address being either a real address of the small block of data in memory or an absolute address of the large block of data in memory. At 908, if the indicated storage frame is a small block of data, then the small block of data is cleared by setting the bytes of the small block of data to zero. At 910, if the indicated storage frame is a large block of data, an operand address of an initial first block of data of the large block of data is obtained from the second general register. The large block of data having a first plurality of first blocks of data. A second plurality of the first plurality of first blocks of data is cleared by setting the bytes of the second plurality of the first plurality of first blocks of data to zero.

The embodiment further involving obtaining a block size indicator from a field of the machine instruction. Based on the block size indicator, a determination is made whether the addressed operand is either the large block of data or the small block of data. The small block of data being a same size as the first block of data. For the large block of data, an address of a next block of data is saved in the second general register. The next block of data being a block of data following the first plurality of first blocks of data. For the large block of data, the address of the next block of data being determined by any one of a) encountering a boundary of the large block of data or b) responding to a program interruption event.

In another embodiment, clear frame information is obtained from the first general register. The clear frame information having a frame size field indicating whether a storage frame is one of a small block of data in memory or a large block of data in memory. If the indicated storage frame is a small block of data, clearing the small block of data. The clearing operation setting the bytes of the small block of data to zero. If the indicated storage frame is a large block of data, obtaining from a second general register an operand address of an initial first block of data of the large block of data. The large block of data having a first plurality of first blocks of data. If the indicated storage frame is a large block of data, clearing a second plurality of the first plurality of first blocks of data, wherein the clearing sets the bytes of the second plurality of first blocks of data to zero.

In another embodiment, a block size indicator is obtained from a field of the machine instruction. Based on the block size indicator, determining the addressed operand is either the large block of data or the small block of data, wherein the small block of data is the same size as the first block of data. For the large block of data, saving an address of a next block of data in the second general register, the next block of data being a block of data following the first plurality of first blocks of data. For the large block of data, the address of the next block of data being determined by either encountering a boundary of the large block of data or responding to a program interruption event.

Perform Frame Management Function (PFMF)—Storage Keys

Figure 9B:
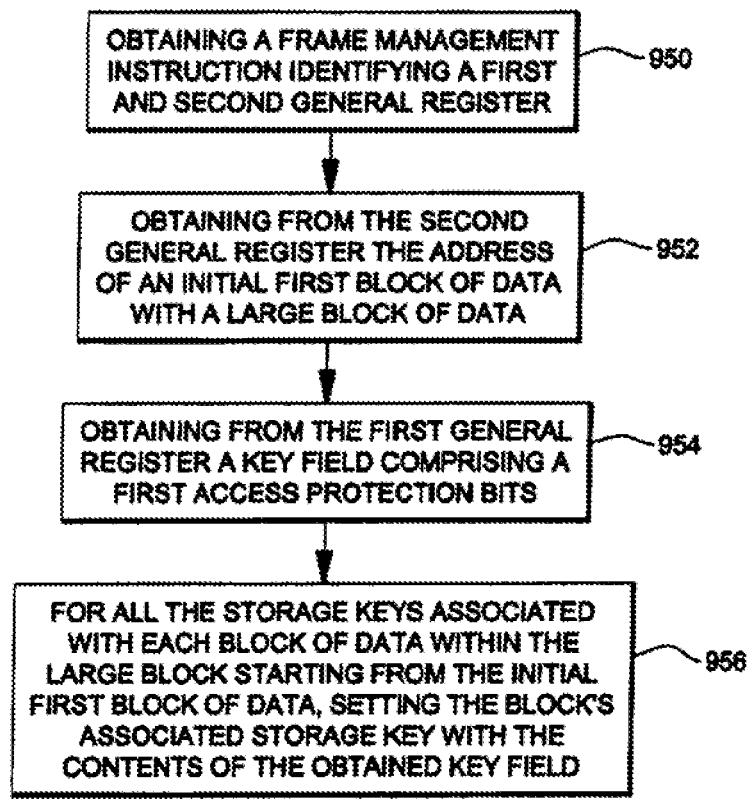

One embodiment of the logic of the Perform Frame Management Function in which the associated storage keys are set according to the instruction is described with reference to FIG. 9B.

Generally, this embodiment involves, at 950, first obtaining a machine instruction defined for the machine architecture, which includes an opcode for a frame management instruction. The machine instruction has a first field identifying a first general register and a second field identifying a second general register. At, 952, obtaining from the second general register the address of an initial first block of data within a large block of data in main storage or memory. At 954, frame management information is obtained from the first general register. The frame management information includes a key field. The key field having first access protection bits. At 956, for a large block of data, a second operand address of an initial first block of data of the large block of data is obtained from the second general register. The large block of data having a first plurality of first blocks of data. Each of the first plurality of first blocks having a corresponding storage key of a first plurality of storage keys. Each storage key having storage access protection bits. Then, for the large block of data, the access protection bits of the key field are set into the storage access protection bits of each storage key of a second plurality of the storage keys.

For the small block of data, an operand address of the small block of data is obtained from the second general register. The small block of data having a corresponding storage key. The storage key having storage access protection bits. For the small block of data, the access protection bits of the key field are set into the storage access protection bits of the storage key.

In another embodiment, a frame management field is obtained from the first general register. The field has a key field with a plurality of access-protection bits and a block size indication. If the block size indication indicates a large block, a second operand address of a first block of data within a large block of data is obtained from a second general register The large block of data having a plurality of blocks of data, wherein each of the plurality of blocks of data is associated with a corresponding storage key with a plurality of storage key access-protection bits. If the block size indication indicates a large block, the storage key access-protection bits of each corresponding storage key of each of the plurality of small blocks of data are set with the access-protection bits of the key field.

Alternatively, if the block size indication indicates a small block, obtaining from the second general register an operand address of the small block of data. The small block of data having a corresponding storage key having storage access-protection bits. If the block size indication indicates a small block, the access-protection bits of the key field are set into the storage access-protection bits of the storage key.

In another embodiment, the block size indication is obtained from any field of the machine instruction, or a field of the first general register. Based on the block size indication, determining whether the addressed operand is one of the large block of data or the small block of data. The small block of data being a same size as the first block of data. The operand address being one of an absolute address of the large block of data or the real address of the small block of data. The real address further being subject to prefixing to determine the absolute address. Further, for the large block of data, saving an address of a next block of data in the second general register, the next block of data being a block of data following the first plurality of first blocks of data. Additionally, for the large block of data, determining the address of the next block of data by any one of encountering a boundary of the large block of data or responding to a program interruption event.

In yet another embodiment, the frame management field further having a reference control field and a change control field. The key field further having a fetch-protection bit, a change bit and a reference bit. The storage key further having a storage fetch-protection bit, a storage reference bit and a storage change bit. For the large block of data, if the reference control field and the change control field are not enabled, setting the fetch-protection bit, the reference bit and the change bit of the key field into corresponding storage fetch-protection bits, storage reference bits and storage change bits of each storage key of the second plurality of the storage keys. If either the reference control field or the change control field are enabled and either the access-protection bits of the key field are not equal to the storage access-protection bits of the storage key or the protection bit is not equal to the storage protection bit, setting the fetch-protection bit, the reference bit and the change bit of the key field into the corresponding storage fetch-protection bits, storage reference bits and storage change bits of each storage key of the second plurality of the storage keys. If the reference control field and the change control field are enabled, the access-protection bits of the key field being equal to the storage access-protection bits of the storage key, and the fetch-protection bit being equal to the storage fetch-protection bit, not changing the storage fetch-protection bits, storage reference bits and storage change bits of each storage key of the second plurality of the storage keys.

PFMF Optimizations for Pageable Guests

In accordance with an aspect of the present invention, the guest memory that is the target of a PFMF instruction may or may not be backed by host memory. If the guest memory is backed by host memory, then the instruction performs as above. However, if the guest memory is not backed by host memory, then certain optimizations can be performed absent host intervention. For example, if the PFMF instruction is to perform a clear operation (e.g., logically set a guest frame to zero or zero the frame), the operation is performed without bringing in the prior host page contents from auxiliary storage to host memory. There is no reason to bring in the contents just to overlay the contents with zeros. Furthermore, the copy of the host page on auxiliary storage is no longer needed and may be discarded. Further, if the PFMF instruction is to perform a set key operation, then that operation is optimized to use the key stored in a host control block (i.e., the PGSTE). That is, there is a field in the PGSTE to hold the storage key value when the frame is not backed in host memory.

Figure 10:
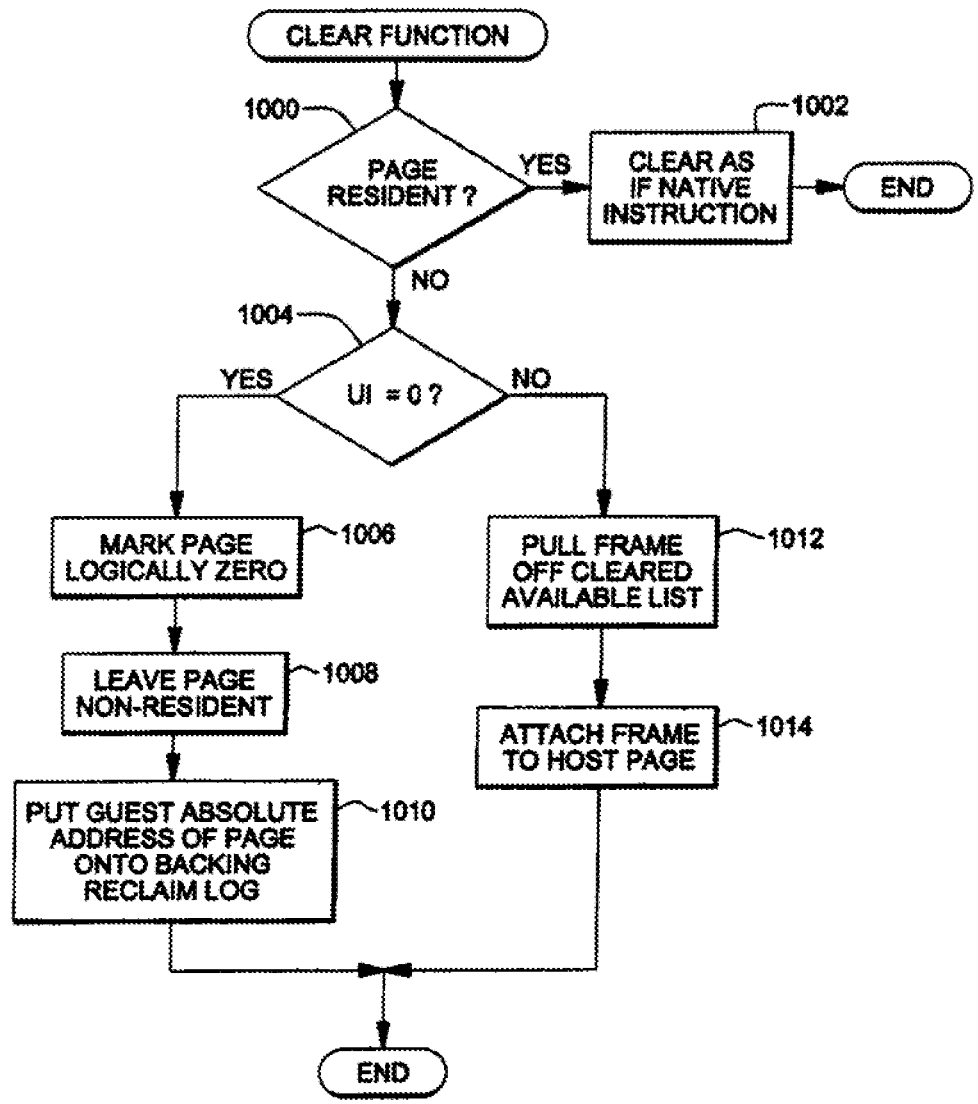
FIG. 10 depicts one embodiment of the logic to clear a frame for a pageable guest, in accordance with an aspect of the present invention.

An overview of the optimizations realized when a clear operation is being performed is described with reference to FIG. 10. In one example, the clear operation is specified in a PFMF instruction. However, in another embodiment, this is not so. The clear operation is specified by itself or in another instruction, etc. In the example herein, the guest frame is a host page and the page is 4K-bytes. However, in other examples, the guest frame may be other than a host page and/or the host page may be other than 4K-bytes. For example, the guest frame may be a large frame backed by multiple small host pages, or the guest frame may be a small frame backed by a portion of a large (for example, 1M-byte) host page. FIG. 10 illustrates a clear operation as it applies to a single host page. If multiple host pages are involved, then the process of FIG. 10 is effectively repeated for each host page. FIG. 11, to be described later, illustrates this case in detail.

Referring to FIG. 10, initially, a determination is made as to whether the host page containing the guest frame that is the target of the clear operation is resident in host memory, INQUIRY 1000. If it is resident (e.g., if invalid bit 604 is off in host PTE 600), then the page is cleared, as if it was a native instruction performing the clear operation, STEP 1002. However, if the page is not resident (i.e., the guest frame is not backed by host memory (e.g., the invalid bit is on)), then a further determination is made as to the intended usage of the page, INQUIRY 1004. If a usage intention (UI) indicator is set to, for instance, zero indicating that the program is not intending to use this guest frame in the immediate future, then a host frame is not committed at this time. Instead, the following actions are taken absent host intervention: the host page is marked logically zero by, for example, setting the Z indicator in the page status table entry corresponding to this page, STEP 1006; the host page containing this guest frame is left non-resident, STEP 1008; and the guest absolute address (as an example) of the page is placed onto a backing reclaim log, so that the host knows that it can reclaim the backing auxiliary storage which holds the prior contents, STEP 1010.

Returning to INQUIRY 1004, if the usage indicator is, for instance, set to one indicating that the guest frame is about to be referenced (again, as defined by the program), then the host page mapping the guest frame is made resident without host intervention through, for instance, an HPMA resolve operation. For example, a host frame is pulled off of a list of cleared available frames, STEP 1012, and is attached to the host page, STEP 1014. The list of cleared available frames includes one or more pre-cleared host frames. By attaching the cleared host frame to the host page, the guest frame mapped in that host page is backed (made host resident) by host memory already cleared. Further details on HPMA resolve are described below with reference to FIG. 13.

Further details regarding processing a PFMF instruction (or one or more operations of the PFMF instruction) in a pageable guest environment, such that the performance of the operations is optimized, are described with reference to FIGS. 11A-11E. In particular, FIGS. 11A-11E depict one embodiment of the logic to process a Perform Frame Management Function by a pageable guest, in accordance with one or more aspects of the present invention. Although this logic describes aspects of executing the PFMF instruction by a pageable guest, one or more aspects of the present invention are equally applicable to the clear frame and/or set key operations of the instruction separate and apart from the PFMF instruction. Further, for one or more aspects of the present invention, it is not necessary to perform both the clear frame and set key functions. Aspects of the invention can apply to just one or the other or both.

Figure 11A:
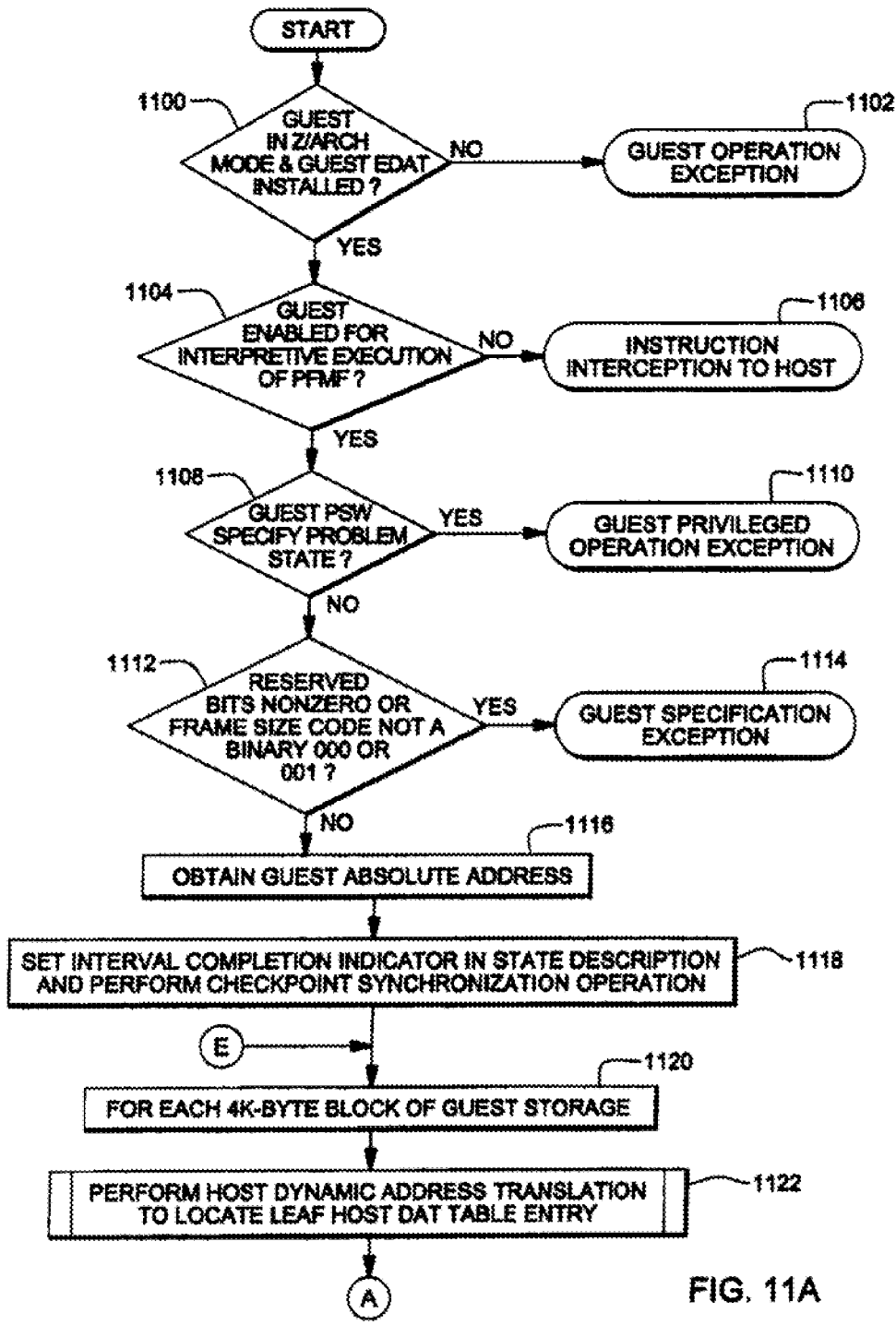
FIGS. 11A-11E depict one embodiment of the logic associated with performing the Perform Frame Management Function instruction and optimizations associated therewith, in accordance with an aspect of the present invention.
Figure 11B:
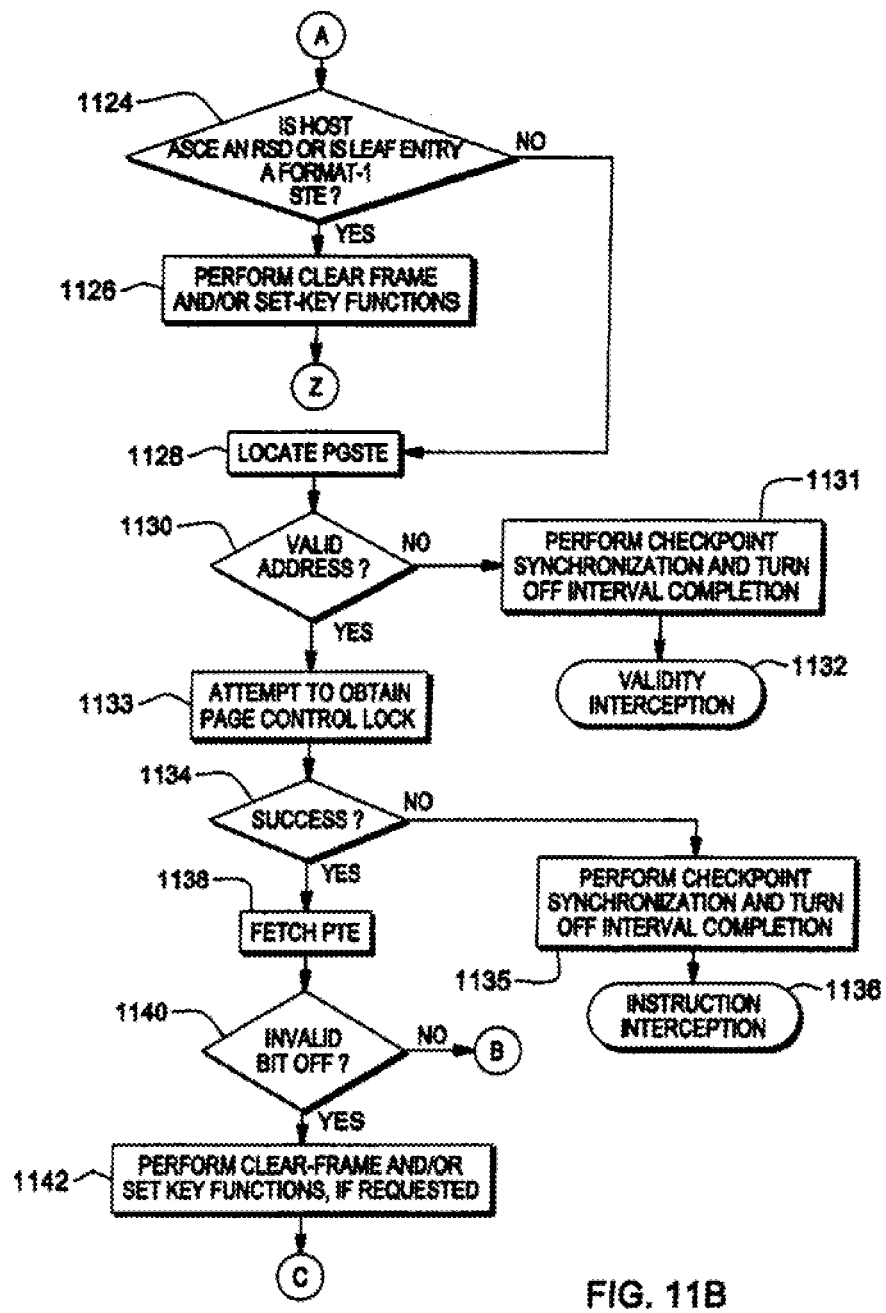
Figure 11C:
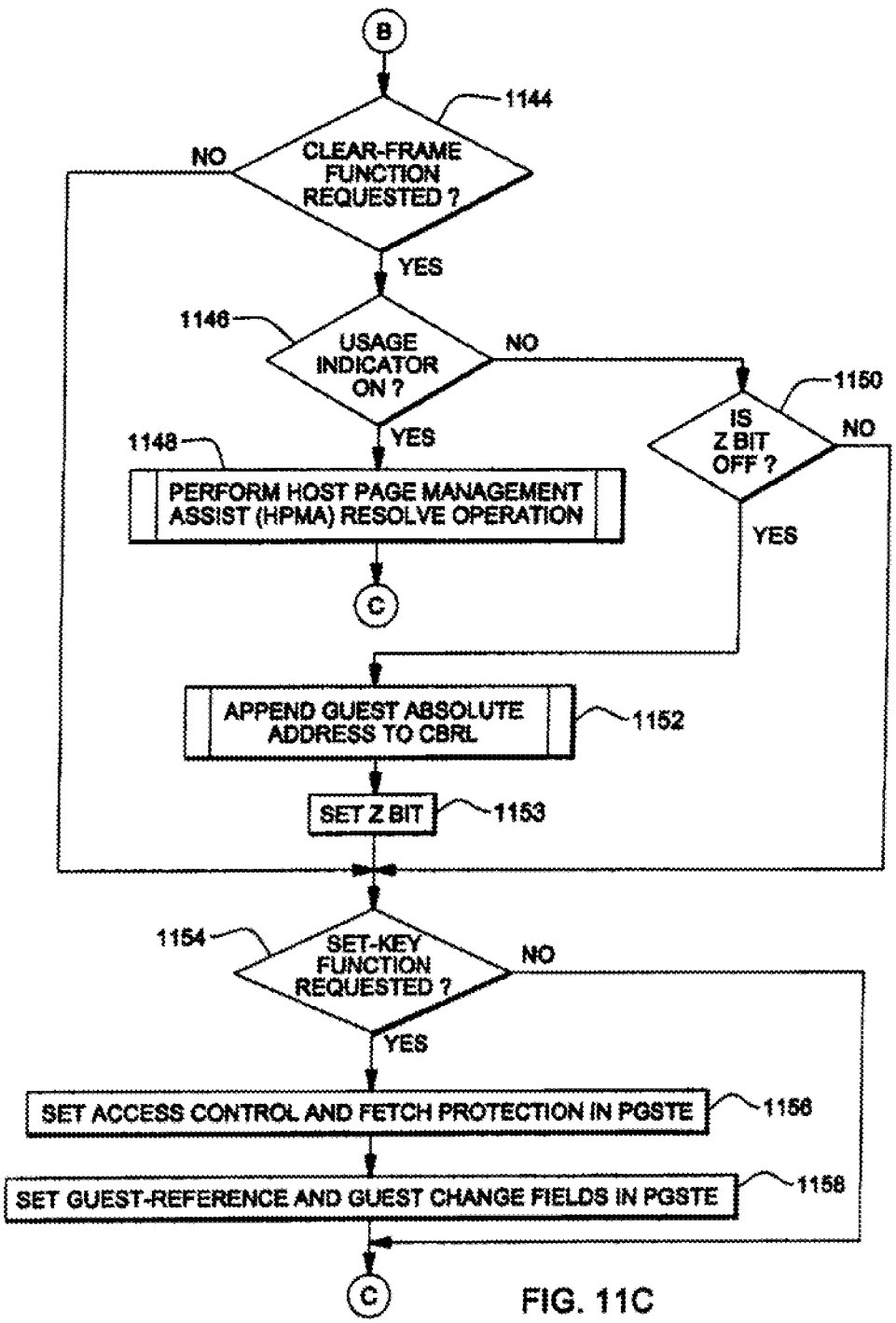
Figure 11D:
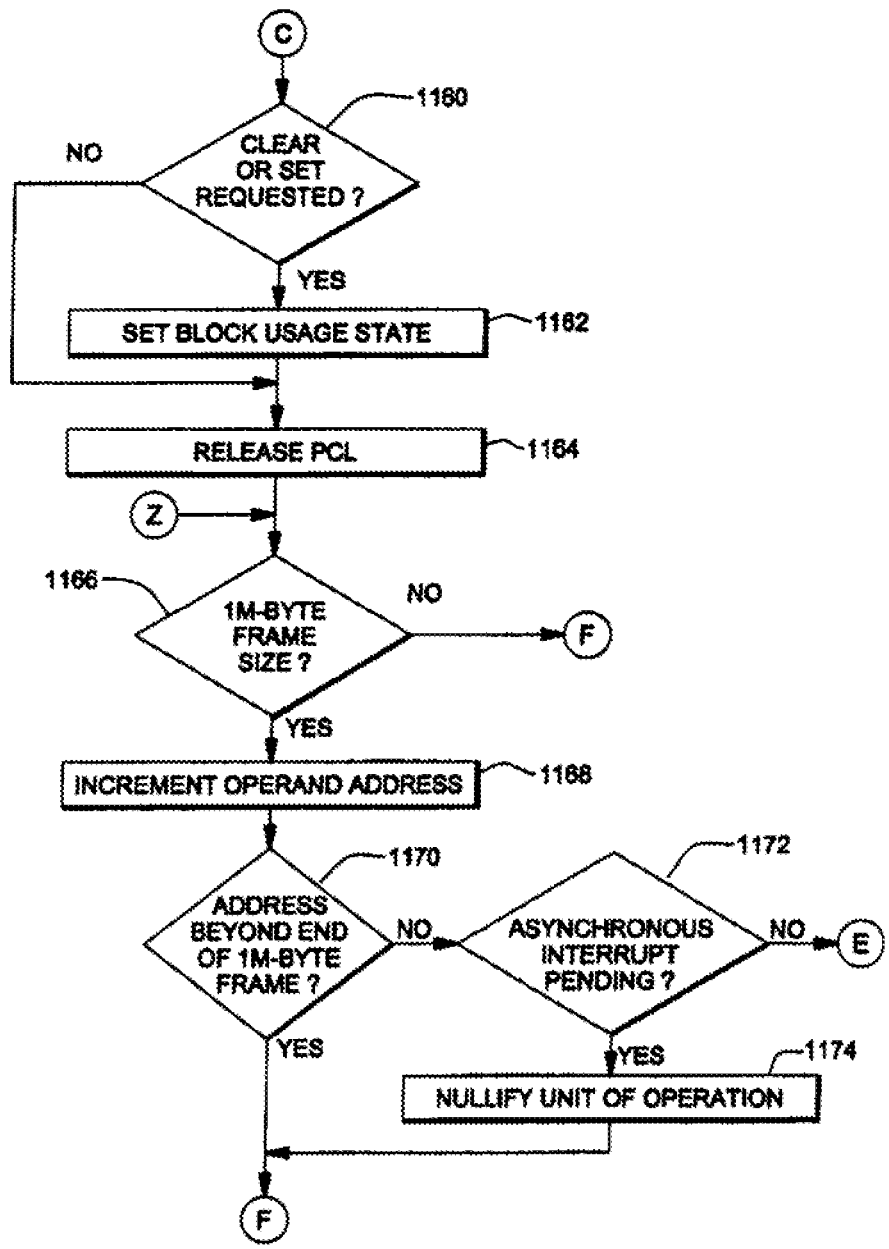
Figure 11E:
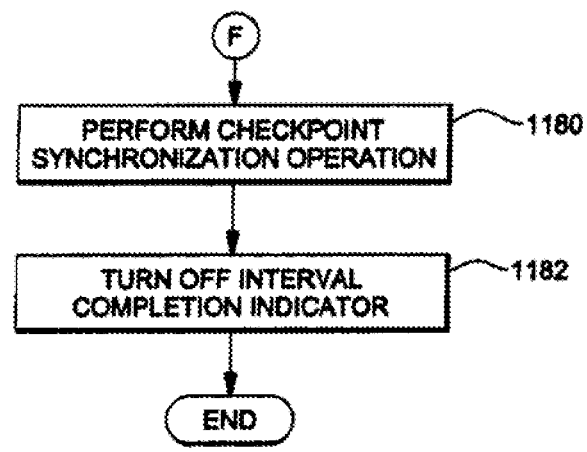

Referring to FIG. 11A, initially various housekeeping details are handled, in this embodiment. In other embodiments, however, one or more of these details can be ignored or eliminated. A determination is made as to whether the guest is in the z/Architecture® mode and whether the enhanced Dynamic Address Translation (DAT) facility (EDAT) is installed, INQUIRY 1100. If either the guest is not in z/Architecture® mode or if EDAT is not installed, then a guest operation exception is presented, STEP 1102. In this example, PFMF is available under the enhanced DAT facility of z/Architecture. However, this may be different for other embodiments. One example of EDAT is described in U.S. Publication No. 2009/0187724A1, entitled, "Dynamic Address Translation with Frame Management," Greiner et al., (IBM Docket No.: POU920070313US1), published Jul. 23, 2009, which is hereby incorporated herein by reference in its entirety.

Should EDAT be installed under the z/Architecture, then a further determination is made as to whether the host has enabled interpretive execution of PFMF for this guest, INQUIRY 1104. As one example, this is indicated by a bit in a control block, known as a state description, that is created by the host to represent the state of a virtual machine and is used by the firmware in interpretive execution.

If the host has not enabled interpretive execution, then an instruction interception is presented to the host, STEP 1106. This allows the host to trap the instruction, if desired, for debugging and special-case simulation.

However, if interpretive execution is enabled, then a check is made to see if the guest program status word (PSW) specifies problem state, INQUIRY 1108. If so, then a guest privileged operation exception is presented, STEP 1110. In this embodiment, PFMF is a privileged instruction for use by operating systems, not application programs. This may be different, however, in other embodiments.

Should the PSW not specify problem state, then a determination is made as to whether the reserved bits are non-zero in general register R1 (i.e., the general register whose number appears as the R1 operand in the instruction), or if the frame size code (FSC) in R1 has a value other than binary 000 or 001, INQUIRY 1112. If the reserved bits are non-zero or the frame size code has a value other than binary 000 or 001, then a guest specification exception is presented, STEP 1114.

Otherwise, the guest absolute address is obtained, STEP 1116. In one example, to obtain the guest absolute address, the frame size code in register R1 is examined. If FSC is binary 000, then the operand is a 4K-byte guest frame specified by the guest real address in R2. Guest prefixing is applied to derive the target guest absolute address. If FSC is binary 001, then the operand is a 1M-byte frame specified by the guest absolute address in R2. This address is used as is.

Thereafter, an interval completion indicator in the state description is set and a checkpoint synchronization operation is performed, STEP 1118. This is done so that if a machine failure occurs during subsequent processing, the host can recognize that host data structures may have been corrupted.

For each 4K-byte block of guest storage designated by the operand, i.e., for a single 4K-byte frame if FSC is binary 000 or for each of the 4K-byte blocks beginning with the operand address and continuing to the next 1M-byte boundary if FSC is binary 001, the following steps are performed, STEP 1120:

The guest absolute address of the frame is treated as a host virtual address, and host dynamic address translation is performed on that address to locate the leaf host DAT-table entry (either a valid format-1 segment table entry designating a large host frame or a page table entry indicating a small frame size), STEP 1122. Examples of DAT are described in "z/Architecture Principles of Operation," IBM® Publication No. SA22-7832-05, April, 2007; and U.S. Publication No. 2009/0187724A1, entitled, "Dynamic Address Translation with Frame Management," Greiner et al., (IBM Docket No.: POU920070313US1), published Jul. 23, 2009, each of which is hereby incorporated herein by reference in its entirety.

Figure 12:
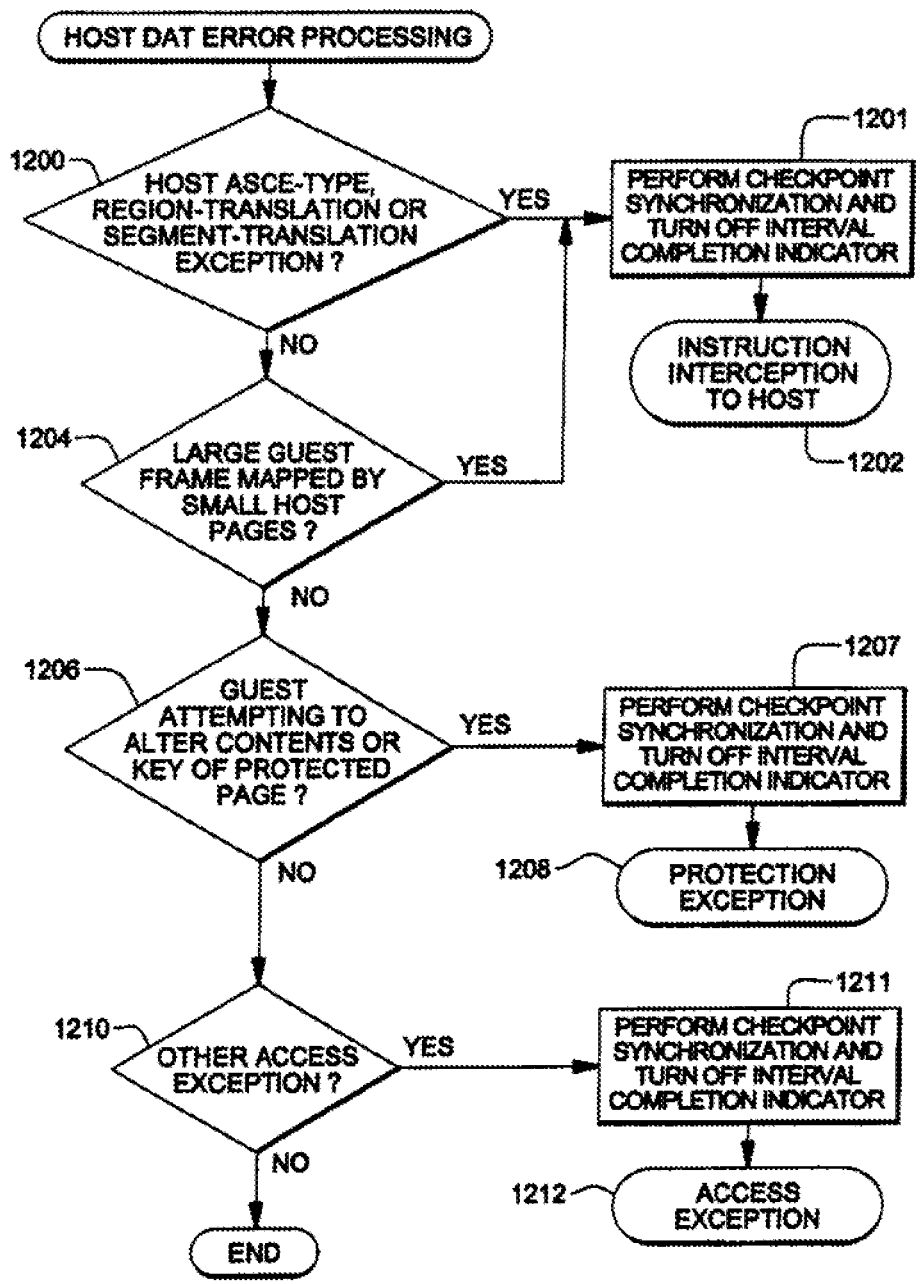
FIG. 12 depicts one example of various error processing associated with dynamic address translation, in accordance with an aspect of the present invention.

Various error processing associated with DAT is described with reference to FIG. 12. For instance, if a host ASCE-type, region translation or segment translation exception condition is encountered preventing the leaf host DAT table entry for the translation from being located, INQUIRY 1200, then checkpoint synchronization is performed and an interval completion indicator is turned off, STEP 1201. This indicates to the host that updates to the host data structures are complete, and the structures are in a consistent state should a machine failure occur. Additionally, the remainder of instruction execution is suppressed and an instruction interception is presented to the host, STEP 1202. This allows the host to resolve the fault condition and at the same time, optimize the handling of PFMF for the case where there is no prior backing content and no host page table or page status table is available.

Otherwise, in one embodiment, if FSC is binary 001, specifying a large (e.g., 1 MB) guest frame, and storage is mapped by small host pages (format control (FC) in host segment table entry is zero), INQUIRY 1204, then checkpoint synchronization is performed and an interval completion indicator is turned off, STEP 1201. Further, an instruction interception is presented to the host, STEP 1202. This allows the host to optimize handling by discarding any prior small-frame backing and backing with a large host frame, if desired. In other embodiments, this test may be omitted or made conditional on, for example, a control bit in the state description.

If the case tested at INQUIRY 1204 does not apply (or if, in another embodiment, the test is bypassed), a determination is next made as to whether host DAT protection is indicated in any of the host RTEs, STE or PTE used in the translation, and either the clear frame (CF) or the set key (SK) operation is requested in the R1 operand, INQUIRY 1206. For the PFMF instruction, DAT protection is recognized even if the leaf host table entry is invalid, to prevent handling which would alter the content of the host page or storage key in the non-host-resident case. If DAT protection is indicated, then checkpoint synchronization is performed and an interval completion indicator is turned off, STEP 1207. Additionally, a protection exception is presented, STEP 1208.

Otherwise, if any other access exception is encountered, such as an invalid host address, INQUIRY 1210, then checkpoint synchronization is performed and an interval completion indicator is turned off, STEP 1211. Additionally, this access exception is presented, as usual, STEP 1212.

Returning to FIG. 11A, subsequent to performing host dynamic address translation to locate the leaf host DAT table entry, a determination is made as to whether the host ASCE was a real-space designation (RSD), for which there are no table entries, or whether the leaf entry is a format-1 STE, INQUIRY 1124. In either of these cases, the guest frame is resident in host memory, so optimizations are not needed. A clear frame and/or set key function, as requested in the CF and SK indicators of the R1 operand, is/are performed directly into the designated 4K-byte block within the host memory containing the guest frame, STEP 1126. In the case of a host RSD, this is the 4K-byte block at the host real address matching the guest absolute address. In the case of a format-1 STE, this is the large frame designated by the segment frame absolute address field of this STE. Processing then continues by advancing to the next 4K-byte block, if any, STEP 1166 (FIG. 11D), described below.

On the other hand, if the host ASCE is not an RSD and the leaf entry is not a format-1 STE, INQUIRY 1124, then the leaf entry is a PTE and processing continues, as described below.

The PGSTE associated with the host PTE is located, STEP 1128, for example, by adding a fixed offset to the PTE address to obtain the PGSTE address. Next, a determination is made as to whether the PGSTE is at an invalid address, INQUIRY 1130. If so, then a checkpoint-synchronization operation is performed and the interval completion indicator is turned off, STEP 1131. Further, instruction execution is terminated and a validity interception is presented to the host, STEP 1132. This signifies an error in the host data structures.

If the PGSTE address is valid, INQUIRY 1130, an attempt is made to obtain the page control lock (PCL) in the host PGSTE corresponding to the host PTE, STEP 1133. In one example, this attempt is made by changing the PCL bit from zero to one using an interlocked update. If this operation fails because the PCL bit is already one, INQUIRY 1134, then a checkpoint synchronization operation is performed and the interval completion indicator is turned off, STEP 1135. Moreover, the remainder of the instruction is suppressed and an instruction interception is presented to the host, STEP 1136.

Should the PCL be obtained successfully, INQUIRY 1134, then the host PTE is fetched and examined, STEP 1138. If the invalid bit in the PTE is off, signifying that the page is resident in host storage, INQUIRY 1140, then a clear frame and/or set key function, as requested in the CF and SK indicators of the R1 operand, is/are performed directly into the designated host small (4K-byte) frame designated by the page frame real address field of this PTE, STEP 1142. Processing then proceeds to INQUIRY 1160 (FIG. 11D), as described below.

Returning to INQUIRY 1140, if the invalid bit is on, and a clear frame function is requested (i.e., the CF indicator is on), INQUIRY 1144 (FIG. 11C), then processing of the clear frame operation proceeds according to one of the following scenarios:

(1) If the usage indicator in the R1 operand is on (e.g., set to 1) specifying that the guest has indicated that it intends to make use of the frame contents in the near future, INQUIRY 1146, then a Host Page Management Assist (HPMA) resolve operation is performed to make the host page resident with zero contents, STEP 1148.

One example of the HPMA operation is described in U.S. Publication No. 2005/0268071A1, entitled "Facilitating Management of Storage of a Pageable Mode Virtual Environment Absent Intervention of a Host of the Environment," Blandy et al., published Dec. 1, 2005, which is hereby incorporated herein by reference in its entirety. Moreover, one example of HPMA resolve processing, in accordance with an aspect of the present invention, is described further below with reference to FIGS. 13A-13B.

Figure 13A:
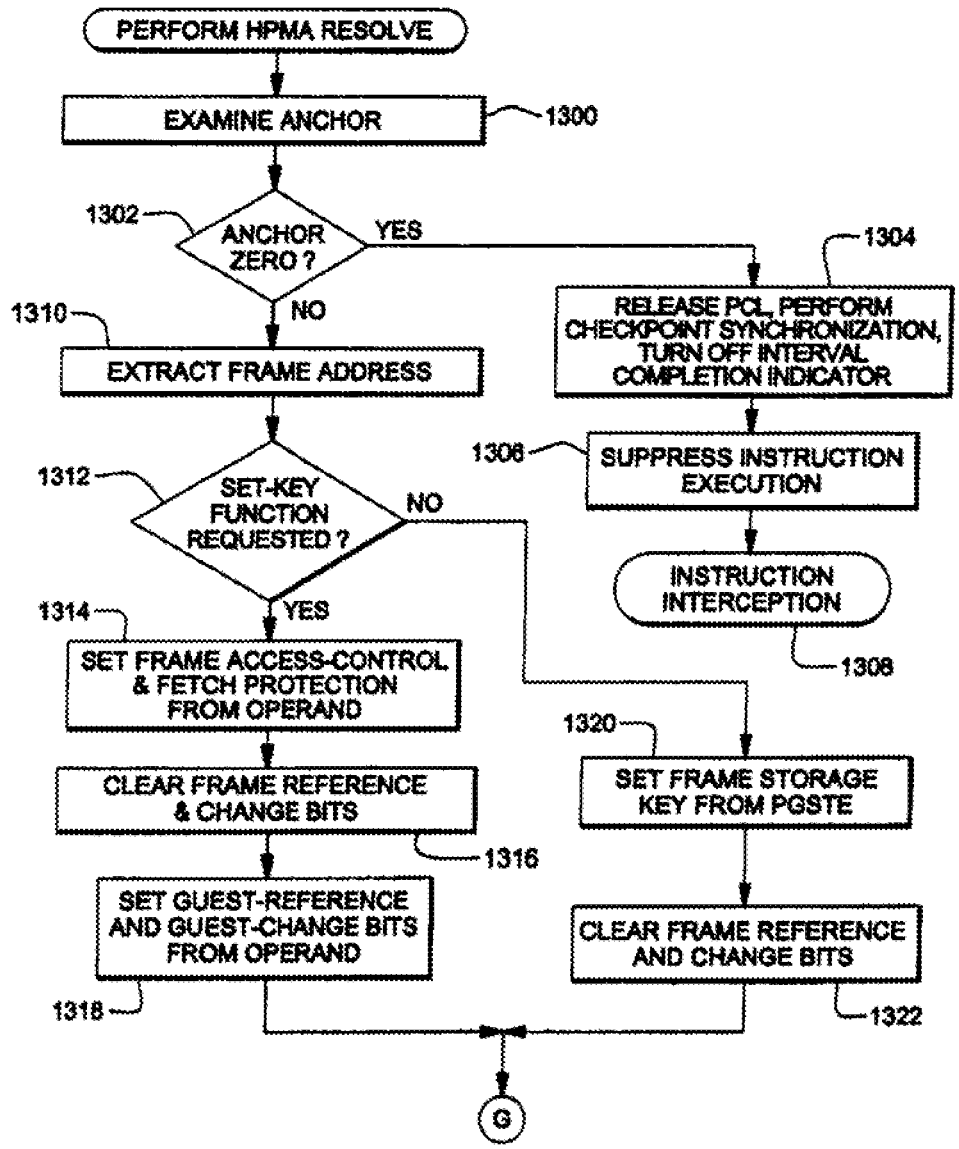
FIGS. 13A-13B depict one embodiment of the logic associated with performing a resolve function, in accordance with an aspect of the present invention.

As described with reference to FIGS. 13A-13B, if HPMA resolve processing fails, then processing of the guest PFMF instruction stops at this point, with an instruction interception or validity interception presented to the host. Otherwise, processing continues at INQUIRY 1160 (FIG. 11D), described below.

(2) If the usage indicator in the R1 operand is off (e.g., set to 0), INQUIRY 1146, and the logically zero (Z) bit in the PGSTE is off, INQUIRY 1150, then the guest absolute (i.e., host virtual) address of this 4K-byte block is appended to the CMM (Collaborative Memory Management) backing reclaim log (CBRL) designated by the state description, STEP 1152. One example of the CBRL and associated processing is described in U.S. Patent Application Publication No. US 2007/0016904 A1, entitled, "Facilitating Processing Within Computing Environment Supporting Pageable Guests," Adlung et al., published Jan. 18, 2007, which is hereby incorporated herein by reference in its entirety. Moreover, one example of appending to the CBRL, in accordance with an aspect of the present invention, is described further below with reference to FIG. 14.

Figure 14:
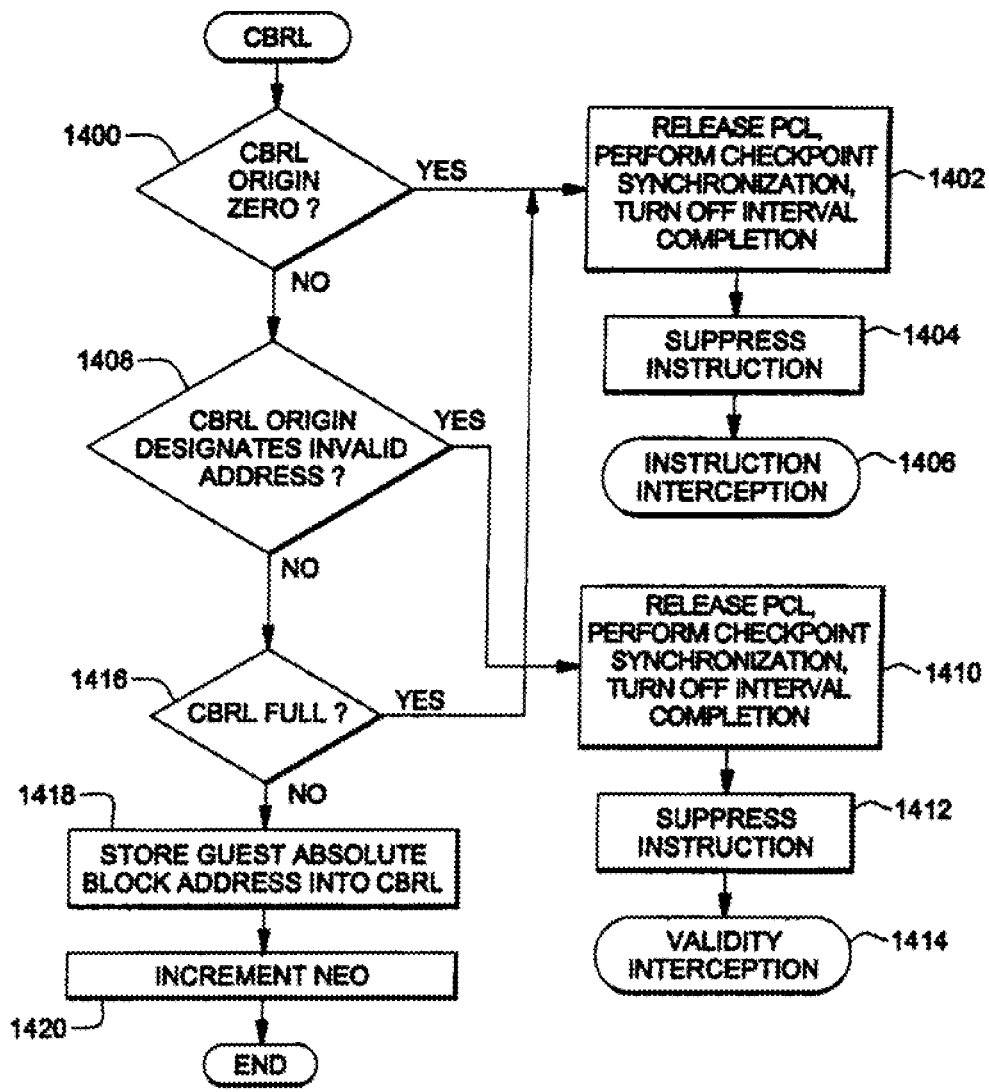
FIG. 14 depicts one embodiment of the logic associated with appending to a backing reclaim log, in accordance with an aspect of the present invention.

As described with reference to FIG. 14, if appending to the CBRL fails, then processing of the guest PFMF instruction stops at this point, with an instruction interception or validity interception presented to the host. Otherwise, the Z bit, which causes subsequent host or firmware actions to treat the host page contents as zeros and allows HPMA resolve to provide a host frame of zeros when the guest later references this storage, is set, STEP 1153, and processing continues at INQUIRY 1154, as described below.

(3) If the usage indicator is off, INQUIRY 1146, and the Z bit is already on, INQUIRY 1150, then no action is needed to clear the contents. The page is already marked as logically zero. Processing continues at INQUIRY 1154, as described below.

If the invalid bit is on, INQUIRY 1140 (FIG. 11B) and the set key function is requested (i.e., the SK bit is on), INQUIRY 1154 (FIG. 11C), then the access control and fetch protection (ACC,F) values 826, 828 from the R1 operand are placed into the ACC and FP fields 702, 704, respectively, of the PGSTE, STEP 1156, and guest reference and guest change fields 712, 714 in the PGSTE are set based on the R and C values 830, 832 specified in the R1 operand, STEP 1158. This records the requested key value with the host page, so that it can be interrogated in the PGSTE, while the host page is not host resident, and set into the host frame when the page is later made resident.

If either the clear frame or the set key function was requested, INQUIRY 1160 (FIG. 11D), then the CMM block usage state in the PGSTE is set to stable (e.g., binary 00), STEP 1162. This is the appropriate setting for a guest frame being put into use. Handling this here takes advantage of the PCL already being held and avoids a separate instruction (e.g., ESSA instruction) by the guest.

Thereafter, or if neither clear nor set was requested, the PCL is released, STEP 1164, by, for instance, setting the PCL bit in the PGSTE to zero, and processing for this 4K-byte block is complete.

Next, a determination is made as to whether a large (e.g., 1M-byte) guest frame size was specified (e.g., FSC=001), INQUIRY 1166. If so, then 4K is added to the operand address in R2, STEP 1168, and a determination is made as to whether this addition resulted in an address beyond the end of the guest frame specified as the operand, INQUIRY 1170. That is, if the addition results in a carry into the next megabyte address, then the loop to process each 4K-byte block in the 1M-byte guest frame, which began at STEP 1120, is exited. If the end of the guest frame has not yet been reached, then a determination is next made as to whether an asynchronous interruption is pending, INQUIRY 1172. If an asynchronous interruption is pending, the unit of operation is nullified, STEP 1174. For instance, the instruction address in the guest PSW is backed up to point to this PFMF instruction. Thereafter, the loop is exited. This allows the interruption to be taken, after which the PFMF instruction can be re-executed and will resume with the next 4K-byte block to be processed.

If there is no asynchronous interruption pending, INQUIRY 1172, then processing returns to STEP 1120 and the logic is repeated with the next 4K-byte block.

After exiting the loop, a checkpoint synchronization operation is performed, STEP 1180 (FIG. 11E), and the interval completion indicator in the state description is turned off, STEP 1182. This indicates to the host that updates to the host data structures are complete, and they are in a consistent state should a machine failure occur. Processing of the guest PFMF instruction is now complete.

In the above description, reference is made to HPMA resolve processing. Further details regarding one embodiment of this processing are described with reference to FIGS. 13A-13B. In this embodiment, HPMA resolve is used to assign host frames to host pages. Initially, the anchor of the available frame descriptor list (e.g., at location 210 hex in the host prefix area) is examined, STEP 1300. If the anchor is zero indicating that the list is empty, INQUIRY 1302, then the PCL is released, a checkpoint synchronization operation is performed, and the interval completion indicator is turned off, STEP 1304. In one example, the PCL is released by setting the PCL bit in the PGSTE to zero. Additionally, the remainder of the instruction processing is suppressed, STEP 1306, and an instruction interception is presented to the host, STEP 1308. This allows the host to complete the execution of the guest PFMF, as well as to replenish the available frame list for future use.

Returning to INQUIRY 1302, if the anchor is not zero, the host frame address is extracted from the frame descriptor at the front of the list (i.e., the one to which the anchor points), STEP 1310. This is an address of a frame available for use whose contents the host has already cleared to zeros.

If the set key function is requested (i.e., the SK indicator is on), INQUIRY 1312, then the access control and fetch protection field in the storage key of this host frame is set based on the key value specified in the R1 operand, STEP 1314. Further, the reference and change indicators in the storage key are set to zeros, STEP 1316, and the guest reference and guest change indicators in the PGSTE are set to the corresponding values specified in the R1 operand, STEP 1318.

Returning to INQUIRY 1312, if the set key function is not requested, the storage key of the frame is set to the value already present in the access control and fetch protection (ACC,FP) fields of the PGSTE, STEP 1320, and the reference and change bits in the storage key are set to zeros, STEP 1322. This ensures that the guest view of the storage key will have the same value when the block is host resident that it had before the block was made resident.

Figure 13B:
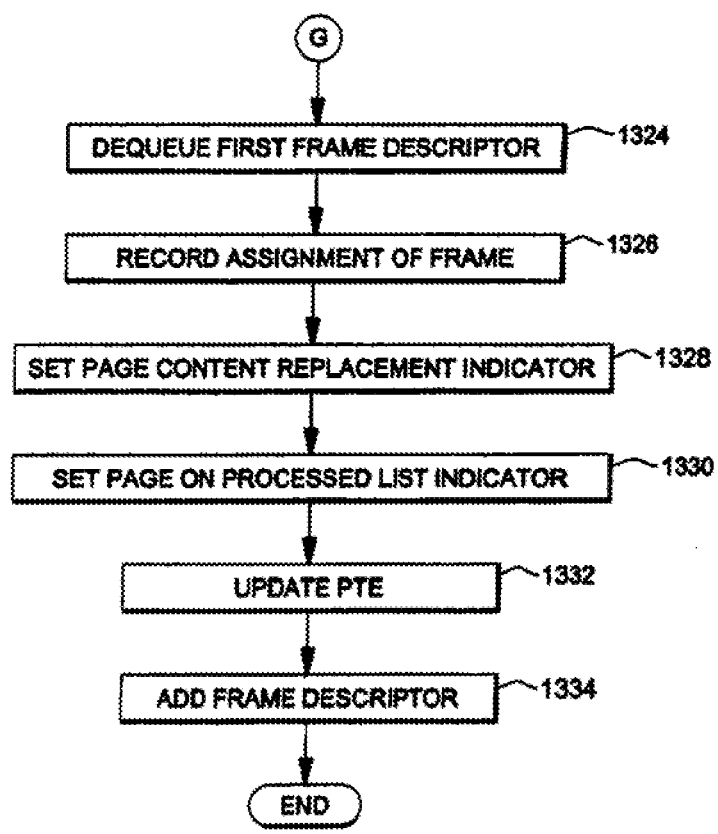

In addition to setting the change bits (STEP 1318 or 1322), the first frame descriptor is dequeued from the available frame descriptor list by copying its forward pointer to the anchor, STEP 1324 (FIG. 13B).

Moreover, the assignment of the host frame to the host page is recorded by, for instance, copying the current PTE contents into the PTE copy field of the frame descriptor and storing the PTE address into the PTE address field of the frame descriptor, STEP 1326. This allows the host to update its data structures at a later point and to locate information describing backing storage for the host page that can be reclaimed.

The page content replacement indicator is set in the PGSTE to indicate that this is a resolve operation with content replacement, STEP 1328. This allows the host to keep statistics on such operations. Further, the page on processed list indicator is set in the PGSTE to indicate that the frame assigned to this page may be found on the processed frame descriptor list, STEP 1330.

The PTE is updated to remove the page invalid condition, STEP 1332. In one example, this is accomplished by storing revised contents including a page frame real address equal to the extracted frame address, an invalid bit with a value of zero, and remaining fields, including the DAT protection bit, copied unchanged from the old PTE contents.

The frame descriptor is added to the front of the processed frame descriptor list, anchored at, for example, location 210 hex in the host prefix area, STEP 1334. This is accomplished by, for instance, storing the prior contents of this anchor into the forward pointer in the frame descriptor, and then performing an interlocked update to replace the prior anchor contents with the address of the frame descriptor. If the interlocked update fails because the anchor contents have changed during this step, then the step is repeated until it succeeds. This concludes the processing associated with the HPMA resolve operation.

Reference is also made in the above description to processing associated with appending to the CMM backing reclaim log (CBRL). One embodiment of the logic associated with this processing is described with reference to FIG. 14. Initially, a determination is made as to whether the CBRL origin in the state description is zero, INQUIRY 1400. If the CBRL origin is zero signifying that there is no CBRL, then the PCL is released, a checkpoint synchronization operation is performed, and the interval completion indicator is turned off, STEP 1402. Further, the remainder of the PFMF instruction execution is suppressed, STEP 1404, and an instruction interception is presented to the host, STEP 1406. This allows the host to allocate memory for a CBRL or to handle the PFMF in simulation.

If the CBRL origin is not zero, but it designates an invalid address, INQUIRY 1408, the PCL is released, a checkpoint synchronization operation is performed, and the interval completion indicator is turned off, STEP 1410. Moreover, the remainder of the instruction execution is suppressed, STEP 1412, and a validity interception is presented to the host, STEP 1414. This signifies an error in the host data structures.

Should the CBRL origin designate a valid address, a determination is made as to whether the CBRL next entry offset (NEO) is a given value (e.g., hex FF8), signifying that the CBRL is full, INQUIRY 1416. If so, the PCL is released, a checkpoint synchronization operation is performed, and the interval completion indicator is turned off, STEP 1402. Additionally, the remainder of instruction execution is suppressed, STEP 1404, and an instruction interception is presented to the host, STEP 1406. This allows the host to process the CBRL and handle the PFMF in simulation.

Otherwise, if the CBRL is not full, the guest absolute block address is stored into the CBRL at the location specified by the NEO, STEP 1418. Further, the NEO is incremented by the length of the address stored, for instance, eight bytes, STEP 1420. This adds the address to the log. The host can subsequently process the log in order to release backing storage resources including the prior page contents, which are no longer needed because the PFMF clear frame operation rendered the contents logically zero. This concludes one example of the CBRL processing.

Described in detail above are optimizations provided for a clear and/or set operation when issued by a pageable guest. As one example, optimizations are provided for operations (e.g., clear frame and/or set key) of a Perform Frame Management Function.

One or more aspects of the present invention can be included in an article of manufacture (e.g., one or more computer-implemented methods) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 15:
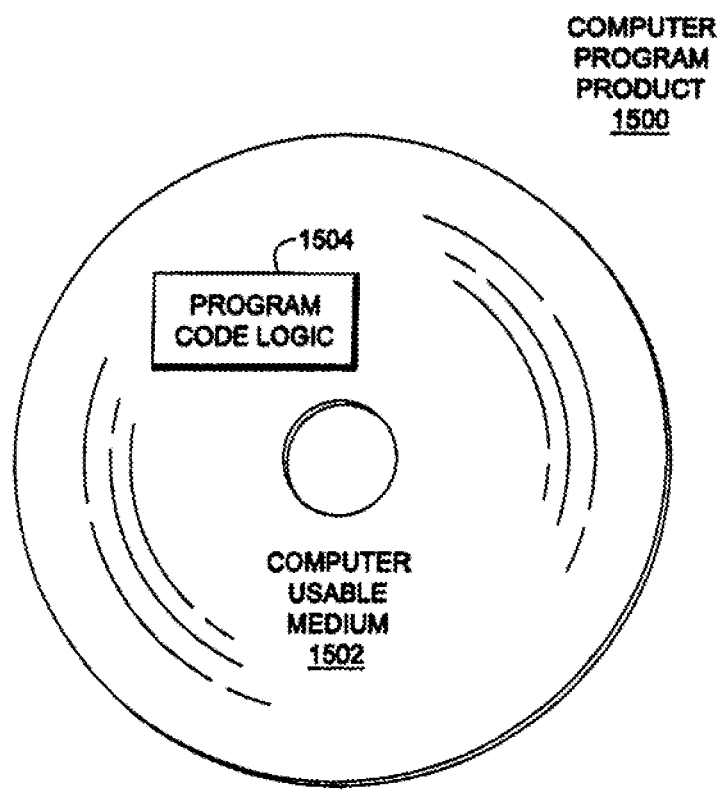
FIG. 15 depicts one embodiment of a computer-implemented method incorporating one or more aspects of the present invention.

One example of an article of manufacture or a computer program product incorporating one or more aspects of the present invention is described with reference to FIG. 15. A computer-implemented method 1500 includes, for instance, one or more computer usable media 1502 to store computer readable program code means or logic 1504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, various optimizations are provided, in accordance with one or more aspects of the present invention. For example, a guest request to clear a 4K-byte frame which is not host-resident may be satisfied without a transition to the host, either by binding the host page mapping the guest frame to a cleared host frame from a list previously supplied by the host (HPMA), or by marking the host page logically zero and appending its address to a CMM-backing-reclaim log (CMM). Which of these actions is taken depends on a usage-intent indicator specified by the guest. Similarly, setting of the guest key is optimized for a guest frame that is not host resident by placing the key value directly into the host PGSTE.

Moreover, the following advantages are provided, in accordance with one or more aspects of the present invention:

Host page faults and page reads of old guest memory contents which are about to be cleared are avoided.

If the guest memory to be cleared is not host resident, but is expected to be referenced soon (per the UI bit), the guest memory addresses are bound to pre-cleared host memory frames from an available list supplied in advance by the host, thus avoiding the overhead of clearing in-line and avoiding a context switch to and from the host program.

If the guest memory to be cleared is not host resident and is not expected to be referenced soon, the host page containing the guest memory is left invalid (i.e., non-resident) and is marked logically zero. This avoids context switches and clearing at the time of the PFMF. In this case, the host page is also added to a backing-reclaim log, that is, a list of host pages whose auxiliary backing storage can be reclaimed. This allows the host to reuse the backing resources more timely.

Following the logically zero operation above, the host page is in a state wherein a subsequent reference to the guest frame can also be resolved without context switches, using the pre-cleared available list described above.

If PFMF requests setting of the storage key for a guest memory mapped by a host page which is and remains not host-resident (i.e., if the page was not resident, and either no clearing was requested, or UI was zero), the key value is placed into the host page-status-table entry for the page, as is done when Set Storage Key Extended (SSKE) is performed on a host-non-resident page. This allows the proper key value to be retained without requiring a physical storage key, which is only available to a resident page.

If set key is performed in the same operation as a clear frame, host serialization can be obtained once instead of twice.

A PFMF operation which requests either frame clearing or key setting also changes the collaborative-memory-management state of the guest frame to stable. This is the desired effect when a guest memory is being redeployed, and eliminates the need for the guest to issue separate ESSA instruction(s).

In one embodiment, the above enhancements operate on host page metadata which is available for 4 KB host pages. When the guest invokes PFMF specifying a 1 MB frame, the operation is instead intercepted to the host, which can then re-back the guest frame with a host 1 MB frame if desired. In this case, the host need not page in and copy the old frame contents, but can simply clear a new 1 MB host frame (or use one from a pre-cleared list). Alternatively, in another embodiment, processing of a guest 1 MB frame mapped by host 4 KB pages is performed on the individual pages, avoiding the interception for example, for a host that does not employ 1 MB host frames.

If a higher-level invalid host table entry (a region- or segment-table entry) prevents access to the host page table and page status table, PFMF is again intercepted to the host, rather than presenting an ordinary region- or segment-translation exception. This allows the host to use the page size specified on PFMF as a hint, and to allocate host backing memory of the same size if desired, or to delay allocation of backing memory if the usage intent is not indicated.

In a further embodiment, metadata at the host segment level (e.g., for 1 MB units of host memory) is provided. In this case, PFMF interpretive execution could take advantage of these to avoid interception when guest frame size and host page size coincide.

Commercial Implementation

Although the z/Architecture® by IBM® is mentioned herein, one or more aspects of the present invention are equally applicable to other machine architectures and/or computing environments employing pageable entities or similar constructs.

Commercial implementations of the PFMF instruction, facilities, and other formats, instructions, and attributes disclosed herein can be implemented either in hardware or by programmers, such as operating system programmers, writing in, for example, assembly language. Such programming instructions may be stored on a storage medium intended to be executed natively in a computing environment, such as the z/Architecture® IBM® Server, or alternatively in machines executing other architectures. The instructions can be emulated in existing and in future IBM servers and on other machines or mainframes. They can be executed in machines where generally execution is in an emulation mode.

In emulation mode, the specific instruction being emulated is decoded, and a subroutine is built to implement the individual instruction, as in a subroutine or driver, or some other technique is used for providing a driver for the specific hardware, as is within the skill of those in the art after understanding the description hereof. Various software and hardware emulation techniques are described in numerous United States patents including: U.S. Pat. Nos. 5,551,013, 5,574,873, 5,790,825, 6,009,261, 6,308,255, and 6,463,582, each of which is hereby incorporated herein by reference in its entirety. Many other teachings further illustrate a variety of ways to achieve emulation of an instruction format architected for a target machine.

Other Variations and Architectures

While various examples and embodiments are described herein, these are only examples, and many variations are included within the scope of the present invention. For example, the computing environment described herein is only one example. Many other environments, including other types of communications environments, may include one or more aspects of the present invention. For instance, different types of processors, guests and/or hosts may be employed. Moreover, other types of architectures can employ one or more aspects of the present invention.

Aspects of the invention are beneficial to many types of environments, including environments that have a plurality of zones, and non-partitioned environments. Further, there may be no central processor complexes, but yet, multiple processors coupled together. Various aspects hereof are applicable to single processor environments.

Further, in the examples of the data structures and flows provided herein, the creation and/or use of different fields may include many variations, such as a different number of bits; bits in a different order; more, less or different bits than described herein; more, less or different fields; fields in a differing order; different sizes of fields; etc. Again, these fields were only provided as an example, and many variations may be included. Further, indicators and/or controls described herein may be of many different forms. For instance, they may be represented in a manner other than by bits. Additionally, although the term address is used herein, any designation may be used.

As used herein, the term "page" is used to refer to a fixed-size or predefined-size area of virtual storage (i.e., virtual memory). As one example, a host page is an area of host virtual storage. The size of the page can vary, although in the examples provided herein, a page is 4K bytes. Further, a "frame" is used to refer to a fixed-size or predefined size area of real or absolute storage (i.e., memory). As examples, a host frame is an area of host real or absolute storage, and a guest frame is an area of guest real or absolute storage. In the case of a pageable guest, this guest real or absolute storage is mapped by host virtual storage. As is common, pages of host virtual storage are backed by frames of host real or absolute storage, as needed. The size of the frame can vary, although in the examples provided herein, a frame is 4K-bytes or 1M-bytes. However, in other embodiments, there may be different sizes of pages, frames, segments, regions, blocks of storage, etc. Moreover, in other architectures, the terms "page" and "segment" may be used interchangeably or the term "page" may be used to apply to multiple size units of virtual storage. The term "obtaining", such as obtaining an instruction, includes, but is not limited to, fetching, having, receiving, being provided, creating, forming, issuing, etc. An instruction can reference other registers or can reference other than registers, such as operands, fields, locations, etc. Many other alternatives to the above are possible. Further, although terms, such as lists, tables, etc. are used herein, any types of data structures may be used. For instance, a table can include other data structures as well. Again, those mentioned herein are just examples.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of executing an instruction in a computing environment, the computer-implemented method comprising:
    obtaining a perform frame management function (PFMF) instruction; and
    executing, by a pageable guest of the computing environment, the obtained PFMF instruction, the executing comprising:
        performing, absent host intervention, a frame management operation on a guest frame, the guest frame being non-resident in host memory, and the frame management operation being determined based on a control of a plurality of controls associated with the PFMF instruction to be used in frame management.

2. The computer-implemented method of claim 1, wherein the frame management operation is indicated using a field of the PFMF instruction.

3. The computer-implemented method of claim 2, wherein the field of the PFMF instruction specifies a register, and the register includes the control specifying the frame management operation.

4. The computer-implemented method of claim 1, wherein an address of the guest frame is indicated using a field of the PFMF instruction.

5. The computer-implemented method of claim 4, wherein the field of the PFMF instruction specifies a register, and the register includes the address of the guest frame.

6. The computer-implemented method of claim 1, wherein the PFMF instruction has further associated therewith a usage indicator to be used with at least one control of the plurality of controls.

7. The computer-implemented method of claim 6, wherein the usage indicator is specified using a field of the PFMF instruction.

8. The computer-implemented method of claim 7, wherein the field of the PFMF instruction specifies a register, and the register includes the usage indicator.

9. The computer-implemented method of claim 6, wherein the frame management operation comprises a clear operation and the usage indicator specifies that a program has indicated that it is likely to use the guest frame within a near future, and wherein the clear operation includes:
   obtaining a host frame from a list of cleared available frames; and
   attaching the obtained host frame to the guest frame to be cleared.

10. The computer-implemented method of claim 6, wherein the frame management operation comprises a clear operation and the usage indicator specifies that a program has indicated that it is not likely to use the guest frame within a near future, and wherein the clear operation includes:
   marking one or more host pages that back the guest frame as logically zero; and
   including at least one address of at least one host page of the one or more host pages in a backing reclaim log.

11. The computer-implemented method of claim 1, wherein the frame management operation comprises a set storage key operation, and the performing comprises including a value of a key in a control block used by a host managing the pageable guest.

12. The computer-implemented method of claim 1, further comprising:
   interpreting the PFMF instruction to identify a predetermined software routine for emulating the PFMF instruction; and
   wherein the executing comprises executing the predetermined software routine to perform one or more operations of the PFMF instruction.

* * * * *